(12) United States Patent
Hasegawa et al.

(10) Patent No.: US 6,559,231 B2
(45) Date of Patent: May 6, 2003

(54) CURING TYPE WATER BASE RESIN COMPOSITION

(75) Inventors: Mitsutaka Hasegawa, Nagoya (JP); Hiroshi Inukai, Nagoya (JP); Eiichi Okazaki, Haguri-gun (JP); Nobushige Numa, Ebina (JP); Masami Sugishima, Hiratsuka (JP); Koki Nakamura, Chigasaki (JP); Keiichiro Saikawa, Hiratsuka (JP); Yushichi Ishihara, Yokohama (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/996,917

(22) Filed: Nov. 30, 2001

(65) Prior Publication Data

US 2002/0128379 A1 Sep. 12, 2002

(30) Foreign Application Priority Data

| Nov. 30, 2000 | (JP) | 2000-364667 |
| Sep. 4, 2001 | (JP) | 2001-266931 |
| Sep. 4, 2001 | (JP) | 2001-266939 |
| Sep. 26, 2001 | (JP) | 2001-293582 |

(51) Int. Cl.$^7$ ................................ C08L 39/04
(52) U.S. Cl. ............... 525/203; 525/203; 525/282; 525/161; 525/448; 524/555
(58) Field of Search .................. 525/203, 282, 525/161, 148; 524/555

(56) References Cited

U.S. PATENT DOCUMENTS 3,689,448 A 9/1972 Berger et al.
5,614,582 A * 3/1997 Hori et al. .................. 524/507

FOREIGN PATENT DOCUMENTS

| JP | 52-22878 | 6/1977 |
| JP | 56-28208 | 3/1981 |
| JP | 56-53119 | 5/1981 |
| JP | 56-29657 | 7/1981 |
| JP | 56-127697 | 10/1981 |
| JP | 62-100502 | 5/1987 |
| JP | 1-242569 | 9/1989 |
| JP | 4-53802 | 2/1992 |
| JP | 4-249587 | 9/1992 |
| JP | 5-339542 | 12/1993 |
| JP | 8-151358 | 6/1996 |
| JP | 8-245878 | 9/1996 |
| JP | 8-283377 | 10/1996 |
| JP | 10-259356 | 9/1998 |

* cited by examiner

Primary Examiner—David W. Wu
Assistant Examiner—Satya Sastri
(74) Attorney, Agent, or Firm—Wenderoth, Lind & Ponack, L.L.P.

(57) ABSTRACT

The present invention relates to a curing type water base resin composition comprising:

(I) a copolymer obtained by copolymerizing an ethylenically unsaturated monomer (a) having a maleimide group, an ethylenically unsaturated monomer (b) having a carbonyl group and other ethylenically unsaturated monomer (c) and (II) a compound having two or more groups per molecule which are the same or different and selected from a hydrazide group, a semicarbazide group and hydrazone group and further comprising, if necessary, as an additional component:

(III) a copolymer having a carbonyl group and/or (IV) a water base polyurethane resin having a carbonyl group or a hydrazine group.

41 Claims, No Drawings

CURING TYPE WATER BASE RESIN COMPOSITION

The present invention relates to a curing type water base resin composition, more specifically to a curing type water base resin composition of a single liquid type which is excellent in low temperature physical properties and which can readily be cured regardless of coating environment.

In recent years, switching from an organic solvent type over to a water base type has been being expedited in the fields of coating materials, inks and adhesives from the viewpoints of resource saving, environmental sanitation, non-public pollution and non-hazardousness. For example, in water base coating materials in the construction field, required are coating materials which are dried at a room temperature and excellent in coating film performances such as a water resistance, a weatherability and a stain resistance, and emulsion particles having a cross-linkable carbonyl group and acryl base resin compositions comprising a dihydrazide compound are disclosed in, for example, Japanese Patent Application Laid-Open No. 249587/1992 as a resin composition for a water base cold-dryable coating material which satisfies such requirement and is suited to construction use.

Further, resin compositions prepared by further blending the above acryl base resin compositions with water base polyurethane resins are proposed in Japanese Patent Application Laid-Open No. 339542/1993, U.S. Pat. No. 5,614,582 (=EP-A-648,794) and Japanese Patent Application Laid-Open No. 259356/1998 for the purpose to provide the above acryl base resin compositions with a toughness, a coating film elasticity and low temperature physical properties. The above compositions are excellent in a storing property and improve in coating film physical properties by using a water base polyurethane resin in combination, but a cross-linking reaction does not sufficiently proceed depending on coating environment in a certain case. There is, for example, the problem that the water resistance at an initial stage after coating (initial water resistance) is unsatisfactory in coating in the environment in which evaporation of moisture is notably slow as observed when the ambient temperature is low.

Intensive investigations repeated by the present inventors in order to solve the problem described above involved in conventional water base cold-dryable single liquid type coating compositions have resulted in finding that a curing type water base resin composition capable of forming a coating film which is excellent in a water resistance and a curing property even at an initial stage after coating regardless of coating environment can be obtained by introducing a maleimide group cured by irradiation with natural light into a copolymer having a cross-linkable carbonyl group, using a hydrazine compound as a cross-linking agent in combination and using supplementarily photocuring caused by a maleimide group in combination with a cross-linking reaction caused by a carbonyl group/cross-linking agent, and they have come to complete the present invention.

Thus, the present invention provides a curing type water base resin composition comprising:
(I) a copolymer obtained by copolymerizing an ethylenically unsaturated monomer (a) having a maleimide group, an ethylenically unsaturated monomer (b) having a carbonyl group and other ethylenically unsaturated monomer (c) and
(II) a compound having two or more groups per molecule which are the same or different and selected from a hydrazide group, a semicarbazide group and hydrazone group.

Also, the present invention provides the curing type water base resin composition described above further comprising as an additional component:
(III) a copolymer having a carbonyl group and/or
(IV) a water base polyurethane resin having a carbonyl group or a hydrazine group.

The curing type water base resin composition of the present invention shall be explained below in further details.

In the present specification, an acryloyl group or a methacryloyl group is expressed as a (meth)acryloyl group; acrylate or methacrylate is expressed as (meth)acrylate; acrylic acid or methacrylic acid is expressed as (meth) acrylic acid; acrolein or methacrolein is expressed as (meth) acrolein; acrylamide or meth acrylamide is expressed as (meth)acrylamide; and an allyl group or a methallyl group is expressed as a (meth)allyl group.

Copolymer (I)

The copolymer (I) is a copolymer which is obtained by copolymerizing the ethylenically unsaturated monomer (a) having a maleimide groups the ethylenically unsaturated monomer (b) having a carbonyl group and the other ethylenically unsaturated monomers (c) and which has a maleimide group and a carbonyl group in a molecule.

The ethylenically unsaturated monomer (a) having a maleimide group is used in order to introduce into the copolymer (I), a maleimide group for three-dimensionally cross-linking a coating film formed from the resin composition of the present invention by optical dimerization by irradiating with natural light.

Included in such ethylenically unsaturated monomer (a) having a maleimide group is a compound [hereinafter referred to merely as an (imide compound)] having an ethylenically unsaturated group and a cyclic imide group represented by the following Formula (1):

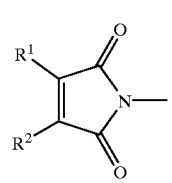

(1)

wherein $R^1$ and $R^2$ each represent independently a hydrogen atom or an alkyl group, or $R^1$ and $R^2$ represent a group forming a carbon ring together with carbon atoms to which they are bonded.

The ethylenically unsaturated group in the imide compound described above includes, for example, a vinyl group, an allyl group and a (meth)acryloyl group, and the (meth) acryloyl group is particularly preferred.

From the viewpoints of the polymerizing property between the imide compounds and the copolymerizing property with other unsaturated monomers, $R^1$ and $R^2$ in the Formula (1) described above each are independently alkyl groups, preferably alkyl groups having 4 or less Gcarbon atoms, or groups forming a carbon ring together, for example —$CH_2CH_2CH_2$— and —$CH_2CH_2CH_2CH_2$—, preferably —$CH_2CH_2CH_2CH_2$—.

To be specific, the imide compound includes, for example, imide (meth)acrylate represented by the following Formula (2):

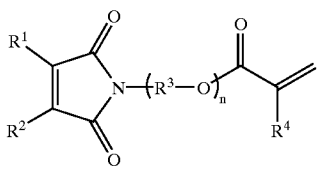

(2)

wherein $R^1$ and $R^2$ are synonymous with those described above; $R^3$ represents an alkylene group, preferably an alkylene group having 1 to 6 carbon atoms and more preferably ethylene or propylene; $R^4$ represents a hydrogen atom or methyl; and n is an integer of 1 to 6, preferably 1 or 2 and more preferably 1.

Compounds represented by the following Formulas (3) and (4) can be given as imide (meth)acrylate described above:

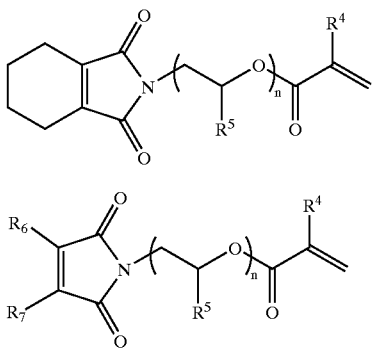

(3)

(4)

wherein $R^4$ and $R^5$ each represent independently a hydrogen atom or methyl; $R^6$ and $R^7$ each represent independently an alkyl group having 4 or less carbon atoms; and n is an integer of 1 to 6.

Imide (meth)acrylate is a conventionally known compound and can be produced from an acid anhydride, aminoalcohol and (meth)acrylic acid by methods described in, for example, K. Kato et al., Organic Synthestic Chemistry Association Report, 30 (10), 897, (1972); Javier de Abajo et al., Polymer, vol. 33 (5), 1090, (1992); Japanese Patent Application Laid-Open No. 53119/1981 and Japanese Patent Application Laid-Open No. 242569/1989.

The ethylenically unsaturated monomer (b) having a carbonyl group is used in order to introduce a carbonyl group into the copolymer (I), and the above carbonyl group is subjected to cross-linking reaction with a functional group in the compound (II) described later to supplement the cross-linking of the coating film by the copolymer (I) when optical cross-linking by the maleimide group described above is unsatisfactory.

Suited as the above ethylenically unsaturated monomer (b) having a carbonyl group is a monomer having at least one carbonyl group selected from an aldehyde group and a keto group and a polymerizable double bond in a molecule, and to be specific, it includes, for example, (meth)acrolein, formylstyrol, vinyl alkyl ketone having 4 to 7 carbon atoms (for example, vinyl methyl ketone, vinyl ethyl ketone and vinyl butyl ketone) and diacetone(meth)acrylamide. Among them, diacetone (meth)acrylamide is preferred for the reason that it is excellent in a reactivity with the compound (11) described later.

The other ethylenically unsaturated monomer (c) copolymerized with the ethylenically unsaturated monomer (a) having a maleimide group and the ethylenically unsaturated monomer (b) having a carbonyl group each described above includes, for example, alkyl (meth)acrylates such as methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth) acrylate, lauryl(meth) acrylate and stearyl (meth)acrylate; cyclic (meth)acrylates such as cyclohexyl (meth)acrylate and isobornyl (meth)acrylate; aralkyl (meth)acrylates such as benzyl (meth)acrylate; alkoxyalkyl (meth)acrylates such as 2-methoxyethyl (meth)acrylate and 2-ethoxyethyl (meth) acrylate; hydroxyalkyl (meth)acrylates such as hydoxyethyl (meth)acrylate and hydoxypropyl (meth)acrylate; vinyl ester compounds such as perfluoroalkyl (meth)acrylate, glycidyl (meth)acrylate, N,N-diethylaminoethyl (meth)acrylate, (meth)acrylic acid, (meth)acrylonitrile, vinyl acetate and vinyl propionate; aromatic vinyl compounds such as styrene and α-methylstyrene; and ethylenically unsaturated monomers having an alkoxysilyl group such as vinyl trimethoxysilane, vinyl triethoxysilane, γ-methacryloyloxypropyl trimethoxysilane and -methacryloyloxypropyl triethoxysilane. Among them, alkyl (meth)acrylates having an alkyl group having 1 to 8 carbon atoms, (meth)acrylic acid, styrene and hydroxyalkyl (meth) acrylates having an alkylene group having 2 to 3 carbon atoms are given as the preferred monomer from the viewpoints of a copolymerizability, coating film physical properties and a particle stability. Further, cyclohexyl (meth) acrylate is given as the preferred monomer from the viewpoint of a weatherability.

The copolymer (I) can readily be produced, or example, by copolymerizing the ethylenically unsaturated monomer (a) having a maleimide group, the ethylenically unsaturated monomer (b) having a carbonyl group and the other ethylenically unsaturated monomer (c) each described above in the presence of a surfactant as an emulsifier according to a conventional emulsion polymerization method.

In the emulsion polymerization described above, the respective components of the ethylenically unsaturated monomer (a) having a maleimide group, the ethylenically unsaturated monomer (b) having a carbonyl group and the other ethylenically unsaturated monomer (c) can be used in such a proportion that the monomer (a) falls usually in a range of 1 to 40% by weight, preferably 4 to 20% by weight; the monomer (b) falls in a range of 1 to 30% by weight, preferably 2 to 25% by weight; and the monomer (c) falls in a range of 40 to 98% by weight, preferably 55 to 94% by weight each based on the total amount of the monomers (a), (b) and (c).

If a use proportion of the monomer (a) described above is less than 1% by weight, the physical properties such as an initial water resistance immediately after coating are likely to be reduced in the environment in which a coating film formed from the resin composition using the resulting copolymer (I) is delayed in vaporization of moisture. On the other hand, if it exceeds 40% by weight, the resin composition tends to be increased in a cross-linking density too much, so that the coating film becomes fragile.

If the monomer (b) described above accounts for less than 1% by weight, a coating film formed from the resin composition using the resulting copolymer (I) tends to be reduced in physical properties such as a hardness, a water resistance and a stain resistance. On the other hand, if it exceeds 30% by weight, the coating film is likely to be increased in a hydrophilicity and reduced in a water resistance after curing.

In the production of the copolymer (I), capable of being used as an emulsifier (surfactant) are those usually used for emulsion polymerization, for example, anionic surfactants such as sodium dialkylsulfosuccinate, sodium dodecylbenzenesulfonate, sodium laurylsulfate, sodium polyoxyethylene alkylphenyl ether sulfate and sodium alkyl diphenyl ether sulfonate and nonionic surfactants such as polyoxyethylene higher alcohol ether and polyoxyethylene alkylphenyl ether. Radically polymerizable surfactants are preferably used from the viewpoint of a water resistance of the coating film formed using the resin composition finally obtained. When a radically polymerizable surfactant is used as the emulsifier, the above radically polymerizable surfactant is incorporated into the copolymer as the third component.

Capable of being used as the radically polymerizable surfactant are, for example, conventionally known ones described in U.S. Pat. No. 3,689,448, Japanese Patent Publication No. 29657/1981, Japanese Patent Application Laid-Open No. 28208/1981, Japanese Patent Application Laid-Open No. 127697/1981, Japanese Patent Application Laid-Open No. 100502/1987 and Japanese Patent Application Laid-Open No. 53802/1992. Further, the commercial products include, for example, "Latemul" (trade name, manufactured by Kao Corporation), "Eleminol" (trade name, manufactured by Sanyo Chemical Industries, Ltd.), "Aquaron" (trade name, manufactured by Dai-ichi Kogyo Seiyaku Co., Ltd.) and "Adeka Reasoap" (trade name, manufactured by Asahi Denka Kogyo K. K.).

In the present invention, particularly suited is a surfactant comprising a polyoxyalkylene group as a principal chain and having a radically polymerizable double bond at one end and an ion-dissociative group at the other end, to be more specific, for example, a compound represented by the following Formula (5):

$$Z-(AO)_n-Y \quad (5)$$

wherein Z represents a group having a radically polymerizable double bond; AO represents an oxyalkylene group; n represents an integer of 2 or more; and Y represents an ion-dissociative group.

The group having a radically polymerizable double bond includes aromatic hydrocarbon groups, alkyl-substituted aromatic hydrocarbon groups, higher alkyl groups and groups having a structure in which a hydrophobic group part such as an alicyclic hydrocarbon group is combined with a radically polymerizable double bond-containing part such as (meth)allyl, propenyl and butenyl groups.

The radically polymerizable surfactant may be either anionic or cationic, and the anionic ones are particularly preferred. Accordingly, preferred as the ion-dissociative group are salts in which an anion is covalently bonded to an oxyalkylene group and a cation is ionically bonded thereto, and to be specific, it includes, for example, —SO$_3$Na, —SONH$_4$, —COONa, —COONH$_4$, —PO$_3$Na$_2$ and —PO$_3$(NH$_4$)$_2$. Among them, —SO$_3$Na and —SO$_3$NH$_4$ are suited.

The repeating number n of the oxyalkylene unit in the polyoxyalkylene group is usually 300 or less, preferably 5 to 50, and the kind of the alkylene group is preferably ethylene or propylene.

To be specific, such radically polymerizable surfactant includes, for example, compounds represented by the following Formulas (6), (7) and (8):

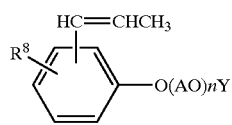
(6)

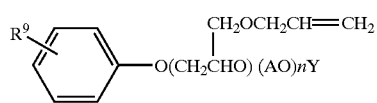
(7)

(8)

wherein $R^8$ and $R^9$ each represent independently a linear or branched alkyl group having 6 to 18, preferably 6 to 16 carbon atoms; $R^{10}$ represents an alkyl group having 8 to 24 carbon atoms, preferably 8 to 22; $R^{11}$ represents a hydrogen atom or methyl; and Y represents the ion-dissociative group described above.

A use amount of the radically polymerizable surfactant is different according to the kinds of the ethylenically unsaturated monomer (a) having a maleimide group, the ethylenically unsaturated monomer (b) having a carbonyl group and the other ethylenically unsaturated monomer (c) and the kind of the radically polymerizable surfactant. In general, it falls preferably in a range of 0.1 to 5 parts by weight per 100 parts by weight the total amount of the monomers used. If a use amount of the radically polymerizable surfactant is less than 0.1 part by weight, an emulsion obtained by emulsion polymerization using this is likely to be reduced in stability. On the other hand, if it exceeds 5 parts by weight, an effect of a rise in a water resistance of the coating film in proportion to the addition amount is not only not observed but also tends to be rather reduced in the water resistance.

Further, anionic high molecular surfactants such as a polycarboxylic acid base and a polysulfonic acid base and nonionic surfactants such as polyvinyl alcohol can be used as well in combination in emulsion polymerization from the viewpoints of a stability of the emulsion and a rise in a water resistance of the coating film. A use amount thereof falls usually in a range of preferably 0.1 to 5 parts by weight per 100 parts by weight of the total amount of the monomers used.

The ethylenically unsaturated monomer (a) having a maleimide group, the ethylenically unsaturated monomer (b) having a carbonyl group and the other ethylenically unsaturated monomer (c) can be emulsion-polymerized by, for example, a method in which the mixture of the monomers (a), (b) and (c) described above are emulsified and dispersed in an aqueous medium using the surfactants described above and a polymerization initiator is added to heat and stir the mixture and a method in which the mixture of the monomers (a), (b) and (c) described above and the surfactants described above are used to prepare first a water base emulsion and in which the water base emulsion is added to an aqueous medium containing a polymerization initiator while heating and stirring. In this case, a chain transfer agent can be used as well, if necessary, in order to control a molecular weight of the resulting copolymer.

The polymerization initiator described above includes, for example, persulfates such as potassium persulfate and ammonium persulfate and peroxides such as hydrogen peroxide, benzoyl peroxide and t-butyl hydroperoxide. They may be used in combination with a reducing agent such as sodium bisulfite and ascorbic acid and may be used in the form of a redox initiator. Among them, the water soluble polymerization initiators are particularly preferred. The chain transfer agent described above includes, for example, dodecylmercaptan, disulfide xanthate, diazothioether and 2-propanol.

The copolymer (I) obtained in the manner described above can have a number average molecular weight falling in a range of usually 1,000 to 1,000,000, preferably 10,000 to 500,000. In the present specification, a number average molecular weight is a value obtained by converting a molecular weight measured by gel permeation chromatography using tetrahydrofuran as a solvent based on a molecular weight of polystyrene.

Compound (II)

The resin composition of the present invention contains the compound (II) having two or more functional groups per molecule which may be the same or different and are selected from a hydrazide group, a semicarbazide group and hydrazone group as a cross-linking agent reacted with a carbonyl group contained in the copolymer (I).

A compound (II-1) having two or more hydrazide groups per molecule includes, for example, dihydrazides of saturated aliphatic dicarboxylic acids having 2 to 18 carbon atoms such as oxalic acid dihydrazide, malonic acid dihydrazide, succinic acid dihydrazide, glutaric acid dihydrazide, adipic acid dihydrazide and sebacic acid dihydrazide; dihydrazides of monoolefinic unsaturated dicarboxylic acids such as maleic acid dihydrazide, fumaric acid dihydrazide and itaconic acid dihydrazide; dihydrazides of phthalic acid, terephthalic acid and isophthalic acid; dihydrazide, trihydrazide or tetrahydrazide of pyromellitic acid; nitrilotriacetic acid trihydrazide, citric acid trihydrazide and 1,2,4-benzenetrihydrazide; ethylenediaminetetraacetic acid tetrahydrazide; 1,4,5,8-naphthoic acid tetrahydrazide; and polyhydrazide obtained by reacting a lower polymer having a carboxylic acid lower alkyl ester group with hydrazine or a hydrazine hydrate (refer to Japanese Patent Publication No. 22878/1977).

If the hydrazide compounds described above have a too strong hydrophobicity, dispersion thereof in water becomes difficult, and an even cross-linked coating film is not likely to be obtained, so that the compounds having a suitable hydrophilicity and a relatively low molecular weight are suitably used. Among the examples described above, suited are dihydrazides of saturated aliphatic dicarboxylic acids such as, for example, adipic acid dihydrazide and succinic acid dihydrazide.

A compound (II-2) having two or more semicarbazide groups per molecule includes, for example, carbonic acid dihydrazide and bissemicarbazide; multifunctional semicarbazides obtained by reacting diisocyanates such as hexamethylenediisocyanate and isophoronediisocyanate or polyisocyanate compounds derived from them with N,N-substituted hydrazines such as N,N-dimethylhydrazine and the hydrazides given as the examples described above in excess amounts; water base multifunctional semicarbazides obtained by reacting the dihydrazides given as the examples described above in excess amounts with isocyanate groups contained in reaction products of the above polyisocyanate compounds with active hydrogen compounds having hydrophilic groups such as polyetherpolyols and polyethylene glycol monoalkyl ethers; and the mixtures of the above multifunctional semi-carbazides and water base multifunctional semicarbazides (for example, Japanese Patent Application Laid-Open No. 151358/1996, Japanese Patent Application Laid-Open No. 283377/1996 and Japanese Patent Application Laid-Open No. 245878/1996).

For example, bisacetyl dihydrazone can suitably be used as a compound (II-3) having two or more hydrazone groups per molecule.

The compounds (II-1), (II-2) and (II-3) described above each can be used alone or may be used in combination of two or more kinds thereof Copolymer (II)

The copolymer (III) is a copolymer having a carbonyl group which is obtained by copolymerizing an ethylenically unsaturated monomer (d) having a carbonyl group with other ethylenically unsaturated monomer (e), and the carbonyl group contained in the copolymer (III) is useful for cross-linking with the compound (II) described above to control a hardness of a coating film formed from the resin compound of the present invention.

The same ones as the ethylenically unsaturated monomer (b) having a carbonyl group used in producing the copolymer (I) can be used as the ethylenically unsaturated monomer (d) having a carbonyl group.

On the other hand, the other ethylenically unsaturated monomer (e) copolymerized with the ethylenically unsaturated monomer (d) having a carbonyl group includes, for example, alkyl (meth)acrylates such as methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, lauryl(meth) acrylate and stearyl (meth)acrylate; cyclic (meth)acrylates such as cyclohexyl (meth)acrylate and isobornyl (meth)acrylate; aralkyl (meth)acrylates such as benzyl (meth)acrylate; alkoxyalkyl (meth)acrylates such as 2-methoxyethyl (meth)acrylate and 2-ethoxyethyl (meth)acrylate; hydroxyalkyl (meth)acrylates such as hydoxyethyl (meth)acrylate and hydoxypropyl (meth)acrylate; vinyl ester compounds such as perfluoroalkyl (meth)acrylate, glycidyl (meth)acrylate, N,N-diethylaminoethyl (meth)acrylate, (meth)acrylic acid, (meth)acrylamide, (meth)acrylonitrile, vinyl acetate and vinyl propionate; aromatic vinyl compounds such as styrene and a-methylstyrene; and ethylenically unsaturated compounds having an alkoxysilyl group such as vinyl trimethoxysilane, vinyl triethoxysilane and γ-methacryloyloxypropyltrimethoxysilane and γ-methacryloyloxypropyltriethoxysilane. Among them, styrene, alkyl (meth)acrylates having an alkyl group having 1 to 8 carbon atoms, (meth)acrylic acid and acrylamide are given as the preferred monomer from the viewpoints of a copolymerizability, coating film physical properties and a particle stability.

The copolymer (III) can readily be produced, for example, by copolymerizing the ethylenically unsaturated monomer (d) having a carbonyl group described above with the other ethylenically unsaturated monomer (e) in the presence of a surfactant as an emulsifier according to a conventional emulsion polymerization method.

In the emulsion polymerization described above, the ethylenically unsaturated monomer (d) having a carbonyl group and the other ethylenically unsaturated monomer (e) can be used in such a proportion that the ethylenically unsaturated monomer (d) having a carbonyl group falls usually in a range of 2 to 30% by weight, preferably 3 to 25% by weight and the other ethylenically unsaturated monomer (e) falls in a range of 70 to 98% by weight, preferably 75 to 97% by weight each based on the total amount of the monomers (d) and (e).

If an amount of the ethylenically unsaturated monomer (d) having a carbonyl group is less than 2% by weight, the physical properties such as a hardness, a water resistance and a stain resistance of a coating film formed from the resin composition using the resulting copolymer (III) are likely to be unsatisfactory. On the other hand, if it exceeds 30% by weight, the copolymer (III) is increased in a cost, and in addition thereto, the coating film is increased in hydrophilicity too much, so that it tends to be reduced in a water resistance even after curing.

A surfactant having a polyoxyalkylene group as a principal chain and having a hydrophobic group at one end and an ion-dissociative group at the other end is suited as the emulsifier used in the production of the copolymer (III), and the above hydrophobic group includes, for example, an alkyl group and an aryl group. The polyoxyalkylene group and the ion-dissociative group include the same ones as those described in relation to the production of the copolymer (I).

When such surfactant is used as the emulsifier, a hydrophilic polyoxyalkylene chain part coordinates between a polymer phase of the copolymer particle formed and an anion in water, and cross-linking of the emulsified copolymer can be prevented from being expedited on the surface of the particle during storage.

Commercial products of such surfactant include, for example, "Newcol 560SN", "Newcol 560SF", "Newcol 707SF" "Newcol 861SE" and "Newcol 1305SN" (all manufactured by Nippon Nyukazai Co., Ltd.), "Hitenol" series, (manufactured by Dai-ichi Kogyo Seiyaku Co., Ltd.), "Emal NC-35" and "Levenol WZ" (all manufactured by Kao Corporation). An amount of these surfactants can be allowed to fall usually in a range of 0.1 to 6% by weights, preferably 0.2 to 5% by weight based on the total amount of the monomers used.

Capable of being used as the emulsifier in addition to the surfactants described above are other anionic surfactants having no polyoxyalkylene chains and the nonionic surfactants and the radically polymerizable surfactants each described above in relation to the production of the copolymer (I). Further, the anionic high molecular surfactants and the nonionic high molecular surfactants each described above may be used in combination for the reason of a rise in a water resistance of the coating film.

Emulsion polymerization of the ethylenically unsaturated monomer (d) having a carbonyl group and the other ethylenically unsaturated monomer (e) can be carried out in the same manner as emulsion polymerization of the ethylenically unsaturated monomer (a) having a maleimide group and the ethylenically unsaturated monomer (b) having a carbonyl group.

The copolymer (III) thus produced can have a number average molecular weight falling in a range of usually 5,000 to 1,000,000, preferably 20,000 to 500,000.

Water Base Polyurethane Resin (IV)

The water base polyurethane resin (IV) is blended with the resin composition of the present invention in order to provide the coating film finally formed with elasticity and toughness for the purpose of elevating the coating film physical properties particularly at a low temperature, and water base polyurethane resins having a hydrazine group and/or a carbonyl group are suited. In order to easily disperse it in an aqueous medium and secure the storage stability after dispersing and a durability and a water resistance of the coating film finally obtained, the above water base polyurethane resin (IV) has preferably an acid value falling in a range of usually 10 to 200 mg KOH/g, particularly 10 to 150 mg KOH/g per resin solid matter. Further, the above water base polyurethane resin (IV) has preferably a number average molecular weight falling in a range of usually 1,000 to 200,000, particularly 2,000 to 100,000.

Water Base Polyurethane Resin Having a Hydrazine Group

The water base polyurethane resin having a hydrazine group which can be used as the water base polyurethane resin (IV) in the present invention includes, for example, a resin (hereinafter referred to as a water base polyurethane resin (IV-A)) prepared by dispersing a urethane prepolymer (A) obtained by reacting a diisocyanate compound (f) and a glycol compound (g) with a glycol compound (h) having a carboxyl group together with a hydrazine derivative (i) in an aqueous medium.

Aliphatic, alicyclic and aromatic compounds having two isocyanate groups in a molecule are included in the diisocyanate compound (f) described above. To be specific, it includes, for example, 2,4-tolylenediisocyanate, 2,6-tolylenediisocyanate, 4,4'-diphenylmethanediisocyanate, m-phenylenediisocyanate, xylylenediisocyanate, tetramethylenediisocyanate, lysinediisocyanate, 1,4-cyclohexylenediisocyanate, 4,4'-dicyclohexylmethanediisocyanate, 3,3'-dimethyl-4,4'-biphenylenediisocyanate, 3,3'-dimethoxy-4,4'-biphenylenediisocyanate, 3,3'-dichloro-4,4'-biphenylenediisocyanate, 1,5-naphthalenediisocyanate, 1,5-tetrahydronaphthalenediisocyanate and isophoronediisocyanate.

The glycol compound (g) includes low molecular weight glycols, high molecular weight glycols, polyesterpolyols and polycarbonatepolyols, and they may be used alone or in a mixture of two or more kinds thereof.

The low molecular weight glycols described above include, for example, ethylene glycol diethylene glycol, triethylene glycol 1,2-propylene glycol 1,3-butylene glycol tetramethylene glycol hexamethylene glycol decamethylene glycol octanediol tricyclodecanedimethylol, hydrogenated bisphenol A, cyclohexanedimethanol and 1,6-hexanediol. The high molecular weight glycols include, for example, polyethylene glycol, polypropylene glycol and polytetramethylene glycol.

The polyesterpolyols described above include those obtained by reacting glycol components with dicarboxylic acid components and can readily be produced by conventionally known method such as an esterification reaction and a transesterification reaction. Further, the above polyesterpolyols include as well polyesterdiols obtained by the ring-opening reaction of cyclic ester compounds such as ε-caprolactone and copolycondensation polyesters thereof.

The glycol compound (h) having a carboxyl group described above includes, for example, 2,2-dimethylolpropionic acid, 2,2-dimethylolbutyric acid, 2,2-dimethylolvaleric acid and polyesterpolyols or polyetherpolyols obtained by condensing them. Further, the above glycol compound (h) having a carboxyl group may be used in combination with hydroxycarboxylic acids such as 12-hydroxystearic acid, paraoxybenzoic acid and salicylic acid.

The urethane prepolymer (A) can be produced by reacting the diisocyanate compound (f) and the glycol compound (g) with the glycol compound (h) having a carboxyl group each described above according to a conventionally known urethane reaction. In this case, a use proportion of these components (f), (g) and (h) shall not strictly be restricted, and they are preferably reacted in such a proportion that an equivalent ratio of the isocyanate groups to the hydroxyl groups contained in these components falls in a range of usually 1:0.5 to 1:0.95, particularly 1:0.6 to 1:0.9.

On the other hand, the hydrazine compound (i) acts as a chain-extending agent in dispersing the urethane prepolymer (A) obtained in the manner described above in an aqueous medium and is introduced into the water base polyurethane resin (IV-A) as a cross-linking functional group for reacting with a carbonyl group contained in the copolymer (I) described above to cure the coating film.

The above hydrazine compound (i) includes, for example, hydrazine, ethylene-1,2-dihydrazine, propylene-1,3-dihydrazine and butylene-1,4-dihydrazine.

A method for dispersing the urethane prepolymer (A) described above into an aqueous medium containing the hydrazine compound (i) includes, for example, a method in which the urethane prepolymer (A) is added in one lot or gradually while stirring water containing the hydrazine compound (i) and a neutralizing agent, mixed and dispersed. In this case, other chain-extending agent and surfactant may be used, if necessary, in combination.

Compounds having at least two active hydrogen atoms per molecule are suited as the chain-extending agent which can be used in combination and include, for example, diamines such as ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine and 1,4-cyclohexanediamine; and polyamines such as diethylenetriamine, dipropylenetriamine and triethylenetetraamine.

On the other hand, the neutralizing agent used in dispersing shall not specifically be restricted as long as it can neutralize a carboxyl group contained in the urethane prepolymer (A) and includes, for example, sodium hydroxide, potassium hydroxide, trimethylamine, dimethylaminoethanol 2-methyl-2-amino-1-propanol, triethylamine and ammonia. The neutralizing agent may be added to the urethane prepolymer (A) to neutralize a carboxyl group in advance or may be added in advance to an aqueous medium to neutralize a carboxyl group at the same time as dispersed. The neutralizing agent is preferably used in such a proportion that it accounts for usually 0.5 to 2.0 equivalent, preferably 0.7 to 1.3 equivalent per one equivalent of a carboxyl group. The water base polyurethane resin (IV-A) may be desolvented, if necessary, by a conventionally known method.

A content of a hydrazine residue contained in the water base polyurethane resin (IV-A) obtained in the manner described above falls preferably in a range of usually 0.005 to 0.2 mole, particularly 0.01 to 0.1 mole per 100 g of the resin solid matter. If the above content is less than 0.005 mole, the sufficiently high cross-linking effect is not obtained in a certain case. On the other hand, if it exceeds 0.2 mole, the coating material tends to be reduced in storage stability.

Water Base Polyurethane Resin Having a Carbonyl Group

The water base polyurethane resin having a carbonyl group which can be used as the water base polyurethane resin (IV) in the present invention includes, for example, a resin (hereinafter referred to as a water base polyurethane resin (IV-B)) prepared by dispersing in an aqueous medium, a urethane prepolymer (3) obtained by reacting the diisocyanate compound (f), the glycol compound (g), the glycol compound (h) having a carboxyl group and an alcohol (j) having a carbonyl group.

Those described in the water base polyurethane resin (IV-A) can similarly be used as the diisocyanate compound (f), the glycol compound (g) and the glycol compound (h) having a carboxyl group each described above.

On the other hand, the alcohol (j) having a carbonyl group is used in order to introduce a cross-linking carbonyl group for reacting with the compound (II) described above to cure the coating film into a polyurethane resin skeleton and includes, for example, diacetonealcohol and 4-hydroxy-2-butanonehydroxyacetone.

The urethane prepolymer (B) can be produced by reacting the diisocyanate compound (f), the glycol compound (g), the glycol compound (h) having a carboxyl group and the alcohol (j) having a carbonyl group each described above according to a conventionally known urethane reaction. In this case, a use proportion of these components (f), (g), (h) and (j) shall not strictly be restricted, and they are preferably reacted in such a proportion that an equivalent ratio of the isocyanate groups to the hydroxyl groups contained in these components falls in a range of usually 1:0.5 to 1:0.95, particularly 1:0.6 to 1:0.9. Among them, the alcohol (j) having a carbonyl group is preferably used in a range of usually 0.01 to 0.9 equivalent, particularly 0.01 to 0.5 equivalent and more preferably 0.01 to 0.25 equivalent per equivalent of an isocyanate group.

A method for dispersing the urethane prepolymer (B) thus obtained into an aqueous medium includes, for example, a method in which the urethane prepolymer (B) is added in one lot or gradually while stirring water containing a chain-extending agent and a neutralizing agent, mixed and dispersed. In this case, a surfactant may be used, if necessary, in combination. The same ones as the hydrazine compound (i) and the chain-extending agent each described above can be used as the chain-extending agent. The water base polyurethane resin (IV-B) formed may be desolvented, if necessary.

A content of a carbonyl group contained in the water base polyurethane resin (IV-B) obtained in the manner described above falls preferably in a range of usually 0.005 to 0.3 mole, particularly 0.01 to 0.2 mole per 100 g of the resin solid matter. If the above content is less than 0.005 mole, the sufficiently high cross-linking effect is not obtained. On the other hand, if it exceeds 0.3 mole, the physical properties such as a water resistance and a storage stability of the coating material tend to be deteriorated due to a reduction in a molecular weight of the urethane prepolymer (B).

A water base polyurethane resin having a carbonyl group which can be used as the water base polyurethane resin (IV) in the present invention includes a resin (hereinafter referred to as a water base polyurethane resin (IV-C)) obtained by copolymerizing in an aqueous medium, a monomer mixture comprising an unsaturated group-containing urethane prepolymer (C) obtained by reacting the diisocyanate compound (f), the glycol compound (g), the glycol compound (h) having a carboxyl group and a hydroxyl group-containing ethylenically unsaturated monomer (k) and an ethylenically unsaturated monomer (m) having a carbonyl group.

Those described in the water base polyurethane resin (IV-A) can similarly be used as the diisocyanate compound (f), the glycol compound (g) and the glycol compound (h) having a carboxyl group each described above.

The hydroxyl group-containing ethylenically unsaturated monomer (k) is used in order to introduce an unsaturated group into a polyurethane resin skeleton and includes, for example, (meth)acrylates such as hydroxyethyl (meth)acrylate, hydroxypropyl (meth)acrylate, hydroxybutyl (meth)acrylate, polyethylene glycol mono(meth)acrylate, polyethylene glycol di(meth)acrylate, polypropylene glycol mono(meth)acrylate, an ε-caprolactone polyaddition product of hydroxyethyl (meth)acrylate, a β-methyl-δ-valeroclactone polyaddition product of hydroxyethyl (meth)acrylate, glycerol mono(meth)acrylate and glycerol di(meth)acrylate; allyl compounds such as allyl alcohol, glycerol monoallyl ether and glycerol diallyl ether; and alkylene oxide adducts thereof having 2 to 4 carbon atoms (an addition mole number of the alkylene oxide is usually 0 to 30 moles, preferably 20 to 30 moles).

In the synthesis of the unsaturated group-containing urethane prepolymer (C), a monohydric alcohol may be used in combination, if necessary, in addition to the diisocyanate compound (f), the glycol compound (g), the glycol compound (h) having a carboxyl group and the hydroxyl group-containing ethylenically unsaturated monomer (k) for the purpose of blocking the excess isocyanate groups and controlling a concentration of the unsaturated group.

A use proportion of these components (f), (g), (h) and (k) shall not strictly be restricted, and they can be reacted in such a proportion that an equivalent ratio of the isocyanate groups to the hydroxyl groups contained in these components falls in a range of usually 1:1 to 1:1.5, particularly 1:1 to 1:1.3. Among them, the hydroxyl group-containing ethylenically unsaturated monomer (k) is preferably used in a range of usually 0.01 to 1 equivalent, particularly 0.02 to 0.8 equivalent per equivalent of an isocyanate group.

The urethane prepolymer (C) can be produced, for example, by a method in which the diisocyanate compound (f), the glycol compound (g), the carboxyl group-containing glycol compound (h) and the hydroxyl group-containing ethylenically unsaturated monomer (k) each described above are reacted in one lot or at a multistage, for example, the diisocyanate compound (f), a part of the glycol compound (g) and the carboxyl group-containing glycol compound (h) are first reacted to synthesize a prepolymer at an isocyanate end and then, the remainder of the glycol compound (g) and the hydroxyl group-containing ethylenically unsaturated monomer (k) are reacted. In this case, in order to promote this reaction, allowed to be used are an amine base catalyst such as triethylamine, N-ethylmorpholine and triethylenediamine and a tin base catalyst such as dibutyltin dilaurate and dioctyltin dilaurate, which are used in conventional urethane reactions. Further, a polymerization inhibitor such as hydroquinone, hydroquinone monomethyl ether and p-benzoquinone can be used in order to prevent the ethylenically unsaturated compound from being polymerized during the urethane reaction.

The urethane prepolymer (C) is then copolymerized with a monomer mixture comprising the ethylenically unsaturated monomer (m) having a carbonyl group in an aqueous medium by a known method. The above ethylenically unsaturated monomer (m) having a carbonyl group can suitably be selected from the ethylenically unsaturated monomers (b) having a carbonyl group described above as the monomer component constituting the copolymer (I) and used.

The urethane prepolymer (C) can be copolymerized with the unsaturated monomer (m), for example, by a method in which the unsaturated group-containing urethane prepolymer (C) is heated and stirred together with an aqueous medium containing the carbonyl group group-containing ethylenically unsaturated monomer (m) and a neutralizing agent while dropwise adding a polymerization initiator; and a method in which an emulsifier is added to a mixture of the unsaturated group-containing urethane prepolymer (C) and the ethylenically unsaturated monomer (m) having a carbonyl group to prepare a water base emulsion and in which the water base emulsion is added to an aqueous medium containing a polymerization initiator while heating and stirring. In this copolymerization, other ethylenically unsaturated monomers may be used, if necessary, in combination.

The polymerization initiator which can be used for the copolymerization described above includes, for example, conventionally known ones including azo base initiators such as azoisovaleronitrile; peroxides such as t-butyl hydroperoxide; and persulfates such as ammonium persulfate. Further, a reducing agent such as formaldehyde sodium sulfoxylate can be used as well in combination for the purpose of lowering a polymerization temperature.

A content of a carbonyl group contained in the water base polyurethane resin (IV-C) obtained in the manner described above shall not strictly be restricted and falls preferably in a range of usually 0.005 to 0.3 mole, particularly 0.01 to 0.2 mole per 100 g of the resin solid matter. If the above content is less than 0.005 mole, the sufficiently high cross-linking effect is not obtained. On the other hand, if it exceeds 0.3 mole, a storage stability of the coating material tends to be deteriorated.

Curing Type Water Base Resin Composition

The curing type water base resin composition provided by the present invention comprises the carbonyl group-containing copolymer (I) into which a maleimide group is introduced and the hydrazine compound (II) as the fundamental components and further comprising, if necessary, the carbonyl group-containing copolymer (III) and/or the water base polyurethane resin (IV) as the additional components, and it is prepared by dissolving or dispersing them in an aqueous medium.

A blending proportion of the respective components described above in the resin composition of the present invention shall not strictly be restricted and can be changed according to the uses of the above resin composition. In general, the compound (II) can be blended in such a proportion that a functional group contained in the compound (II) falls in a range of 0.01 to 2 moles, preferably 0.1 to 1.5 mole per mole of a carbonyl group contained in the copolymer (I).

When the carbonyl group-containing copolymer (III) and/ or the water base polyurethane resin (IV) are used as the additional components, the compound (II) can be blended in such a proportion that a functional group contained in the compound (II) falls in a range of usually 0.01 to 2 moles, preferably 0.1 to 1.5 mole per mole of the total amount of carbonyl groups contained in the copolymer (1), the copolymer (III) and the water base polyurethane resin (IV).

The copolymer (III) can be used in a range of usually 7/93 to 90/10, preferably 20/80 to 80/20 in terms of a solid matter weight ratio of copolymer (I)/copolymer (III), and the water base polyurethane resin (IV) can be used in a range of usually 95/5 to 10/90, preferably 90/10 to 50/50 in terms of a solid matter weight ratio of copolymer (I)/water base polyurethane resin (IV). Further, when the copolymer (III) and the water base polyurethane resin (IV) are used in combination, the copolymer (III) can be used in a range of usually 5 to 150 parts by weight, preferably 5 to 100 parts by weight and more preferably 5 to 80 parts by weight per 100 parts by weight of the total resin solid matter of the copolymer (I) and the water base polyurethane resin (IV).

Further, an organosilicate compound or a modified organosilicate compound can be added, if necessary, to the resin composition of the present invention in order to further improve a stain resistance of the coating film when used for a top coating material for single layer finishing or multilayer finishing. The organosilicate compound which can be for such purpose includes, for example, a compound represented by the following Formula (9):

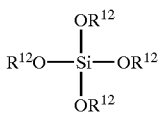

(9)

wherein $R^{12}$ is the same or different and represents a hydrogen atom or a monovalent hydrocarbon group having 1 to 10, preferably 1 to 4 carbon atoms.

Suited as the hydrocarbon group described above are, for example, alkyl groups such as methyl, ethyl, n-propyl, iso-propyl, n-butyl i-butyl, t-butyl n-pentyl, iso-pentyl, n-hexyl i-hexyl and n-octyl and aryl groups such as phenyl.

Specific examples of the organosilicate compound represented by Formula (9) includes, for example, tetrahydroxysilane, tetramethoxysilane, tetraethoxysilane, tetrapropoxysilane, tetrabutoxysilane, tetraphenoxysilane and dimethoxydiethoxysilane. They can be used alone or in combination of two or more kinds thereof.

Branched or linear condensation products of the organosilicate compounds themselves described above can be used as well, and a condensation degree thereof falls suitably in a range of usually 2 to 100, particularly 5 to 50.

When introducing the organosilicate compound and/or a condensatin product hereof described above into the water base composition, it can be blended in the form of an emulsion prepared by forcibly dispersing it in water together with an emulsifier by means of a homogenizer.

Further, a modified organosilicate compound prepared by reacting an alkoxy group or a hydroxyl group contained in the organosilicate compound and/or a condensation product thereof described above with a part (for example, 0.001 to 0.5 mole, particularly 0.05 to 0.2 mole of the polyalkylene glycol base compound per mole of the above alkoxy group or hydroxyl group) of a polyalkylene glycol base compound can particularly suitably be used for the reason that they have a good solubility in water.

The polyalkylene glycol base compound as a modifying agent includes a compound represented by the following Formula (10):

wherein $R^{13}$ represents a hydrogen atom, an alkyl group or an aryl group; $R^{14}$ represents an alkylene group having 2 to 4 carbon atoms; and n is 2 to 60.

To be specific, such compound includes, for example, polyalkylene glycols such as polyethylene glycol, polypropylene glycol and polytetramethylene glycol; alkoxypolyalkylene glycols such as methoxypolyethylene glycol ethoxypolyethylene glycol ethoxypolypropylene glycol and ethoxypolybutylene glycol; and polyoxyalkylene alkylphenyl ethers such as polyoxyethylene nonylphenyl ether and polyoxyethylene octylphenyl ether. In particular, polyethylene glycol and polyoxyethylene nonylphenyl ether are suited.

A content of the organosilicate compound described above in the resin composition of the present invention can be allowed to fall in a range of usually 0.1 to 50 parts by weight, preferably 1 to 20 parts by weight per 100 parts by weight of the resin sold matter contained in the above resin composition.

In the resin composition of the present invention, a compound having two or more (meth)acryloyl groups such as alkylene glycol di(meth)acrylate, polyalkylene glycol poly(meth)acrylate, urethane (meth)acrylate and polyester (meth)acrylate can be added, if necessary, in order to promote photo-curing in the copolymer (I).

Further, capable of being blended, if necessary, are a color pigment, an extender pigment, a surfactant, a dispersant, a defoaming agent, a thickener, a film-forming aid, a preservative, an antifreezing agent and the like.

In the resin composition of the present invention, a maleimide group contained in the copolymer (I) is optically dimerized by sunlight to be three-dimensionally cross-linked, and carbonyl groups contained in the copolymer (I) and the copolymer (III) and/or the water base polyurethane resin (IV) if present are reacted with the hydrazine compound (II) as moisture is vaporized to be three-dimensionally cross-linked.

A maleimide group contained in the copolymer (I) efficiently absorbs sunlight to be cross-linked and therefore forms a cross-linked coating film which is excellent in a water resistance, a weatherability and a stain resistance. On the other hand, carbonyl groups contained in the copolymer (I) and the copolymer (III) and/or the water base polyurethane resin (IV) if present are quickly cross-linked with the hydrazine compound (II) as moisture is vaporized, so that they are reacted and cross-linked even under a condition on which no sunlight shines like in the night to improve a water resistance of the coating film.

Thus, the curing type water base resin composition of the present invention can be used for various applications. It can be used, for example, for a coating agent, a cure-finishing agent for fibers, a water repellent, a sealant, a binder, an adhesive and a pressure sensitive adhesive. In this case, usable substrates include, for example, glass, slate, metal, wood, plastics and concrete. To specifically show uses of the coating agent, they include, for example, coating materials for civil engineering and construction, coating materials for acid rain proofing, stain-proofing coating materials, water repellents, moisture-proof coating agents for electric and electronic parts and back coating agents for a magnetic tape.

The resin composition of the present invention is useful for a coating material among covering materials and particularly useful for an exterior coating material.

Water Base Coating Material Composition

When using the resin composition of the present invention as a coating material, conventional additives for a coating material can be blended. The additives include, for example, fillers such as clay, talc and titan white; film-forming aids such as ethylene glycol, monobutyl ether and dipropylene glycol monobutyl ether; plasticizers such as dibutyl dethylene diethylene glycol, monobutyl ether, phthalate and dioctyl phthalate; tackifiers such as rosin, terpenephenol and petroleum resins; various surfactants used for the purposes of humidifying, dispersing and defoaming; and thickeners, thixotropy agents and antifreezing agents.

Further when used as a coating material for coloring, a pigment can be blended. Conventional pigments for a coating material can be used as the pigment. To be specific, they include, for example, color pigments such as titanium oxide, carbon black and red iron oxide; extender pigments such as calcium carbonate, talc, mica, clay, diatomaceous earth, silicate and baryte; and aggregates, and they can suitably be selected and used according to use purposes of the coating material composition of the present invention.

The pigment is preferably used in a content falling in a range of 10 to 70% in terms of a pigment volume concentration (hereinafter abbreviated as "PVC") so that the above coating material composition is not substantially prevented from being photo-cured and a suitable covering property as an enamel coating material is maintained.

In this case, the (pigment volume concentration "PVC") is a volume proportion of the pigment component contained in the mixed solid matter of the resin and the pigment in the above coating material composition and is a value calculated from the following equation:

$$PVC\ (\%) = \frac{\text{volume of pigment component}}{(\text{volume of pigment component}) + (\text{volume of resin solid matter})} \times 100$$

PVC described above can be allowed to fall in a range of 10 to 60%, preferably 15 to 55% when the coating material composition of the present invention is used as a top coating material and in a range of 30 to 70%, preferably 30 to 66% when it is used as an under coating material.

The water base coating material composition of the present invention is readily cured at a room temperature, and curing thereof is further expedited by irradiation with natural light, so that it is particularly suited to coating material uses for coating interior finish and exterior finish of buildings, bridges and shipping. A coating film having an excellent performance can be formed even with single layer finish, and therefore it can be used as a single layer top coating material. In addition thereto, it can also be used as a top coating material for multilayer finish or an under coating material for controlling a base.

The coating material composition of the present invention can be applied to a base material face, a base-controlling face or an old coating film face, and the above base material face shall not specifically be restricted and includes, for example, a concrete face, a mortar face, a slate board, a PC board, an ALC board, a cement calcium silicate board, a concrete block face, wood, stone, plastic and metal. The base-controlling face or the old coating film face includes coating film faces of an acryl resin base, an acryl urethane resin base, a polyurethane resin base, a fluororesin base, a silicon acryl resin base, a vinyl acetate resin base and an epoxy resin base which are provided on these base materials.

A coating amount of the coating material composition of the present invention falls suitably in a range of usually 0.3 to 1.5 kg/m$^2$, preferably 0.4 to 1.0 kg/m$^2$ when used for single layer finish; in a range of usually 0.06 to 0.20 kg/m$^2$, preferably 0.8 to 1.6 kg/m$^2$ when used as a top coating material; and in a range of usually 0.3 to 2.0 kg/m2, preferably 0.5 to 1.5 kg/m$^2$ when used as an under coating material.

It can be coated by means of conventionally known applicators such as a roller, an air spray, an airless spray, a lithin gun, a universal gun and a brush.

The present invention shall more specifically be explained below with reference to examples. "Part" means part by weight.

Production of Copolymer Having a Maleimide Group and a Carbonyl Group

PRODUCTION EXAMPLE 1

Mixed were 10 parts of imide acrylate represented by the following Formula (11) (hereinafter referred to merely as imide acrylate), 5 parts of diacetoneacrylamide, 50 parts of n-butyl methacrylate, 20 parts of methyl methacrylate, 14 parts of n-butyl acrylate and one part of methacrylic acid, and added to the mixture were 100 parts of deionized water and 0.5 part of "Aquaron HS 10" (remark 1) to prepare a monomer emulsion by means of a rotary homomixer:

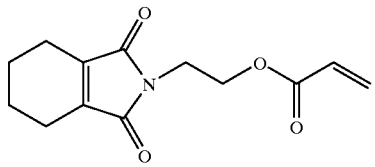

On the other hand, the inside of a flask charged with 45 parts of deionized water and 0.5 part of "Aquaron HS10" (remark 1) was substituted with nitrogen, and then the flask was heated to a temperature of 80° C. Added thereto were one part of ammonium persulfate and a 2 weight % portion of the monomer emulsion described above while maintaining the internal liquid at a temperature of 80° C. The remaining monomer emulsion was dropwise added in 2 hours from 15 minutes later after added, and the mixture was ripened as it was for 2 hours. After ripened, it was cooled down, and 3 parts of 10 wt % aqueous ammonia was dropwise added thereto as a neutralizing agent to obtain a copolymer water dispersion (A-1) of an emulsion type.

(Remark 1) "Aquaron HS10": radically polymerizable surfactant represented by the following Formula (12), manufactured by Dai-ichi Kogyo Seiyaku Co, Ltd:

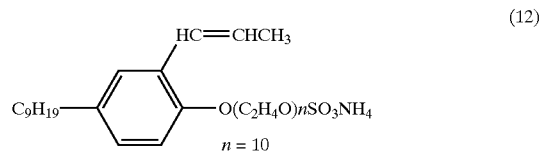

PRODUCTION EXAMPLE 2 AND PRODUCTION EXAMPLES 4 to 6

A copolymer water dispersion (A-2) and copolymer water dispersions (A-4) to (A-6) were obtained by the same method as in Production Example 1, except that the monomer emulsion composition was changed as shown in the following Table 1.

PRODUCTION EXAMPLE 3

A copolymer water dispersion (A-3) was obtained by the same method as in Production Example 1, except that "Newcol 707SF" (remark 2) was substituted for "Aquaron HS10" (remark 1).

(Remark 2) "Newcol 707SF": anionic surfactant having a polyoxyethylene chain, non-volatile matter: 30%), manufactured by Nippon Nyukazai Co., Ltd.

TABLE 1

| Monomer emulsion | Production Example | | | | | |
|---|---|---|---|---|---|---|
| composition | 1 | 2 | 3 | 4 | 5 | 6 |
| Copolymer water dispersion name | A-1 | A-2 | A-3 | A-4 | A-5 | A-6 |
| Imide acrylate | 10 | 10 | 10 | 10 | 0 | 0 |
| Diacetoneacrylamide | 5 | 10 | 5 | 0 | 5 | 0 |
| n-Butyl methacrylate | 50 | 45 | 50 | 55 | 50 | 55 |
| Methyl methacrylate | 20 | 20 | 20 | 20 | 30 | 30 |
| n-Butyl acrylate | 14 | 14 | 14 | 14 | 14 | 14 |
| Methacrylic acid | 1 | 1 | 1 | 1 | 1 | 1 |
| Deionized water | 100 | 100 | 100 | 100 | 100 | 100 |

TABLE 1-continued

| Monomer emulsion | Production Example | | | | | |
|---|---|---|---|---|---|---|
| composition | 1 | 2 | 3 | 4 | 5 | 6 |
| Aquaron HS10 (remark 1) | 0.5 | 0.5 | | 0.5 | 0.5 | 0.5 |
| Newcol 707SF (remark 2) | | | 1 | | | |

Production of Copolymer Having a Carbonyl Group

PRODUCTION EXAMPLE 7

A flask charged with 36 parts of deionized water and 0.5 part of "Newcol 707SF" (remark 2) was substituted with nitrogen and hated to 80° C. Added thereto was 0.1 part of ammonium persulfate while maintaining the internal liquid at 80° C., and then a monomer emulsion having the following composition was dropwise added in 3 hours.

| Monomer emulsion composition | |
|---|---|
| Diacetoneacrylamide | 5 parts |
| Acrylic acid | 0.5 part |
| Styrene | 15 parts |
| Methyl methacrylate | 37 parts |
| 2-Ethylhexyl acrylate | 16 parts |
| n-Butyl acrylate | 26.5 parts |
| Deionized water | 52.4 parts |
| Newcol 707SF (remark 2) | 9.6 parts |
| Ammonium persulfate | 0.2 part |

A solution prepared by dissolving 0.1 part of ammonium persulfate in one part of deionized water was dropwise added in 30 minutes from 30 minutes later after finishing dropwise adding and maintained further at 80° C. for 2 hours to obtain a copolymer water dispersion (B-1) of an emulsion type.

Production of Water Base Polyurethane Resin Having a Hydrazine Group

PRODUCTION EXAMPLE 8

A four neck flask of 2 liters was charged with 268.3 parts of methyl ethyl ketone, 260 parts of polypropylene glycol (molecular weight: about 2,000), 26.5 parts of 2,2'-dimethylolpropionic acid and 116 parts of isophoronediisocyanate, and it was sealed with dry nitrogen while stirring and heated up to 70° C. The internal liquid was maintained at a temperature of 70° C. for one hour and then further heated to 80° C., and it was maintained as it was at a temperature of 80° C. for 6 hours. Then, it was cooled down to 30° C. to obtain a urethane prepolymer solution. On the other hand, another four neck flask of 2 liters was charged in advance with an aqueous solution prepared by dissolving 7.8 parts of a 80% hydrazine aqueous solution and 21 parts of triethylamine in 764 parts of deionized water, and 670.8 parts of the urethane prepolymer solution described above was slowly added thereto while stirring to prepare a water dispersion. Then, the resulting water dispersion was heated to 50° C., and the solvent was removed under reduced pressure, followed by adding deionized water to adjust the concentration, whereby obtained was a translucent water base polyurethane resin (U-1) having a solid content of 35.4% and an acid value of 34 mg KOH/g.

Production of Water Base Polyurethane Resin Having a Carbonyl Group

PRODUCTION EXAMPLE 9

A four neck flask of 2 liters was charged with 396 parts of methyl ethyl ketone, 333.3 parts of polypropylene glycol (molecular weight: about 1,000), 67 parts of 2,2'-dimethylolpropionic acid, 19.7 parts of 1,6-hexanediol and 296 parts of isophoronediisocyanate, and it was sealed with dry nitrogen while stirring and heated up to 70° C. The internal liquid was maintained at a temperature of 70° C. for one hour and then further heated to 80° C., and it was maintained at 80° C. for 2 hours, followed by further heating it to 80° C. and maintaining at 80° C. for 2 hours. Then, 19.3 parts of diacetone alcohol was dropwise added in about 30 minutes, and the temperature was further maintained at 80° C. for 4 hours. Thereafter, it was cooled down to 30° C. to obtain a urethane prepolymer solution. On the other hand, another four neck flask of 2 liters was charged in advance with an aqueous solution prepared by dissolving 11.8 parts of triethylamine and 10.0 parts of piperazine in 868 parts of deionized water, and 565.6 parts of the urethane prepolymer solution described above was slowly added thereto while stirring to prepare a water dispersion. Then, the resulting water dispersion was heated to 50° C., and the solvent was removed under reduced pressure, followed by adding deionized water to adjust the concentration, whereby obtained was a translucent water base polyurethane resin (U-2) having a solid content of 30.2% and an acid value of 36 mg KOH/g.

PRODUCTION EXAMPLE 10

A four neck flask of 2 liters was charged with 860 parts of "Kyowanol D" (remark 3), 2,000 parts of polypropylene glycol (molecular weight: about 1,000), 740 parts of polycaprolactonediol (molecular weight: about 530) and 210 parts of 2,2'-dimethylolpropionic acid, and it was sealed with dry nitrogen while stirring and heated up to 100° C. Dropwise added was 1,110 parts of isophoronediisocyanate while maintaining the internal liquid at a temperature of 100° C. After finishing dropwise adding, the liquid was stirred at 100° C. and sampled from about one hour later, and 195 parts of hydroxyethyl methacrylate and 37 parts of n-butyl alcohol were added at a point of time when a concentration of an isocyanate group reached 0.41 meq/g. After stirring at 100° C. for 2 hours, the liquid was cooled down to 40° C., and 162 parts of triethylamine and 9,000 parts of deionized water were added to obtain an unsaturated urethane prepolymer water dispersion having a solid content of 30%. On the other hand, another four neck flask was charged with 100 parts of this unsaturated urethane prepolymer water dispersion and 3 parts of diacetoneacrylamide and heated to 60° C., and separately dropwise added in one hour while stirring were a solution prepared by dissolving 0.2 part of t-butyl hydroperoxide in 5 parts of deionized water and a solution prepared by dissolving 0.2 part of formaldehyde sodium sulfoxylate in 5 parts of deionized water. Further, the liquid was ripened at 60° C. for 30 minutes and then cooled down to obtain a water base polyurethane resin (U-3) having a solid content of 30% and an acid value of 20 mg KOH/g.

(Remark 3) "Kyowanol D": texanol isobutyl ether, manufactured by Kyowa Hakko Kogyo Co., Ltd.

Production of Modified Organosilicate

PRODUCTION EXAMPLE 11

A reactor equipped with a stirrer, a thermometer, a refluxing tube, a nitrogen-introducing tube and a water separator was charged with 500 parts of "Ethyl Silicate 48" (remark 4), 324.5 parts of "Newcol 568" (remark 5) and 0.082 part of "Scat 24" (remark 6) and heated to 120° C. while stirring in nitrogen atmosphere. Then, it was heated up to 160° C. in 4 hours and maintained at the same temperature for one hour. In this case, 25 parts of evaporated ethanol and the like were distilled off by means of the water separator to obtain 800 parts of modified organosilicate.

(Remark 4) "Ethyl Silicate 48": condensation product of ethyl silicate, manufactured by Tama Chemicals Co., Ltd.

(Remark 5) "Newcol 568": polyoxyethylene nonylphenol ether, manufactured by Nippon Nyukazai Co., Ltd.

(Remark 6) "Scat 24": tin base catalyst, manufactured by Sankyo Organic Chemicals Co., Ltd.

EXAMPLE 1

Blended with 100 parts of the copolymer water dispersion (A-1) was 0.3 part (0.29 mole of a hydrazine group based on a carbonyl group of the copolymer) of adipic acid hydrazide (hereinafter referred to as ADH), and then mixed were 5 parts of tripropylene glycol n-butyl ether as a film-forming aid and 0.5 part of a thickener (Acrysol RM-8W, manufactured by Rohm & Haas Co., Ltd.) to obtain a composition (refer to table 2).

The composition thus obtained was coated on an aluminum plate at a room temperature in a film thickness of 50 $\mu$m by means of a bar coater.

After coating, the plate was dried in a thermostatic chamber of 10° C. for 24 hours or exposed outdoors (facing the south in fine weather) for 2 hours. Two kinds of the resulting samples were subjected to the following evaluation tests. The results thereof are shown in Table 3.

Evaluation Methods:

a. Water Resistant Blushing Property

The sample was dipped in warm water of 40° C. for one day to visually evaluate (1) a blushing level of the film during dipping and (2) a blushing level of the film after taken out from water and left standing at a room temperature for one day:

○: (1) not blushed, (2) lustrous film having no blushed part

Δ: (1) slightly blushed, (2) not blushed but decreased in luster

×: (1) blushed, (2) remaining blushed b. Carbon Stain Property

A kerosene 5% dispersion of carbon powder (MA100) was prepared and coated on the film, and the wiping property with a paper towel was evaluated after left standing for 24 hours:

○: completely removed

Δ: removed to such an extent that a trance remained

×: could scarcely be removed

EXAMPLE 2

A composition was produced (refer to Table 2) by the same method as in Example 1, except that the copolymer water dispersion (A-2) was substituted for the copolymer water dispersion (A-1) and a blending amount of ADH was changed to 0.6 part. The composition thus obtained was evaluated in the same manner as in Example 1. The results thereof are shown in Table 3.

EXAMPLE 3

A composition was produced (refer to Table 2) by the same method as in Example 1, except that the copolymer water dispersion (A-3) was substituted for the copolymer water dispersion (A-1). The composition thus obtained was evaluated in the same manner as in Example 1. The results thereof are shown in Table 4.

COMPARATIVE EXAMPLE 1

A composition was produced (refer to Table 2) by the same method as in Example 1, except that ADH was not blended. The composition thus obtained was evaluated in the same manner as in Example 1. The results thereof are shown in Table 3.

COMPARATIVE EXAMPLES 2 TO 4

Compositions were produced (refer to Table 2) by the same method as in Example 1, except that the copolymer water dispersions (A-4), (A-5) and (A-6) each were substituted for the copolymer water dispersion (A-1). The compositions thus obtained were evaluated in the same manner as in Example 1. The results thereof are shown in Table 3.

COMPARATIVE EXAMPLE 5

A composition was produced (refer to Table 2) by the same method as in Example 3, except that ADH was not blended. The composition thus obtained was evaluated in the same manner as in Example 1. The results thereof are shown in Table 4.

TABLE 2

| | Composition | | |
|---|---|---|---|
| | | ADH | |
| | Copolymer water dispersion (100 parts) | Part | Functional group mole ratio (hydrazine group/carbonyl group) |
| Example 1 | A-1 | 0.3 | 0.29 |
| Example 2 | A-2 | 0.6 | 0.29 |
| Example 3 | A-3 | 0.3 | 0.29 |
| Comparative Example 1 | A-1 | 0 | 0 |
| Comparative Example 2 | A-4 | 0.3 | — |
| Comparative Example 3 | A-5 | 0.3 | 0.29 |
| Comparative Example 4 | A-6 | 0.3 | — |
| Comparative Example 5 | A-3 | 0 | 0 |

TABLE 3

| | Water resistant blushing property | | | | Carbon stain property | |
|---|---|---|---|---|---|---|
| | Sample dried indoors at 10° C. | | Sample dried outdoors | | Sample dried indoors at 10° C. | Sample dried outdoors |
| | During dipping | After drying | During dipping | After drying | | |
| Example 1 | Δ | ○ | ○ | ○ | Δ | ○ |
| Example 2 | ○Δ | ○ | ○ | ○ | Δ | ○ |
| Comparative Example 1 | × | × | ○ | ○ | × | ○ |

TABLE 3-continued

|  | Water resistant blushing property | | | | Carbon stain property | |
|---|---|---|---|---|---|---|
|  | Sample dried indoors at 10° C. | | Sample dried outdoors | | Sample dried indoors at 10° C. | Sample dried outdoors |
|  | During dipping | After drying | During dipping | After drying | | |
| Comparative Example 2 | X | X | ○ | ○ | X | ○ |
| Comparative Example 3 | Δ | ○ | Δ | ○ | Δ | Δ |
| Comparative Example 4 | X | X | X | X | X | X |

TABLE 4

|  | Water resistant blushing property | | | | Carbon stain property | |
|---|---|---|---|---|---|---|
|  | Sample dried indoors at 10° C. | | Sample dried outdoors | | Sample dried indoors at 10° C. | Sample dried outdoors |
|  | During dipping | After drying | During dipping | After drying | | |
| Example 3 | X | ○ | Δ | ○ | Δ | ○ |
| Comparative Example 5 | X | X | Δ | ○ | X | ○ |

Production of Premix Coating Materials

PRODUCTION EXAMPLES 12 TO 19

A vessel was charged in order with the respective components shown in Composition A in the following Table 5, and the mixture was continued to be stirred for 30 minutes by means of a disperser until it was homogenized to obtain a pigment paste. Then, the respective components shown in Composition B in Table 5 were added in order to the above pigment paste, and the mixture was stirred by means of the disperser until it was homogenized to obtain premix coating materials (P-1) to (P-4) and (Q-1) to (Q-4).

TABLE 5

|  |  | Production Example | | | | | | | |
|---|---|---|---|---|---|---|---|---|---|
|  |  | 12 | 13 | 14 | 15 | 16 | 17 | 18 | 19 |
|  | Premix coating material name | P-1 | P-2 | P-3 | P-4 | Q-1 | Q-2 | Q-3 | Q-4 |
| Composition A | 40% Copolymer water dispersion (A-3) |  |  | 34 |  |  |  |  |  |
|  | 40% Copolymer water dispersion (A-5) |  |  |  |  |  |  | 34 |  |
|  | 40% Copolymer water dispersion (A-6) |  |  |  |  |  |  |  | 34 |
|  | Clean water | 5 | 20 |  | 5 | 5 | 20 |  |  |
|  | Ethylene glycol | 2 | 2 | 2 | 2 | 2 | 2 | 2 | 2 |
|  | Slaoff 72N (remark7) | 0.1 | 0.1 | 0.1 | 0.1 | 0.1 | 0.1 | 0.1 | 0.1 |
|  | Nopcosand K (remark 8) | 0.3 | 0.5 | 0.5 | 0.3 | 0.3 | 0.5 | 0.5 | 0.5 |
|  | Titan White JR-805 (remark 9) | 20 |  |  | 20 | 20 |  |  |  |
|  | Titan White JR-800 (remark 10) |  | 22 | 15 |  |  | 22 | 15 | 15 |
|  | Calcium carbonate |  | 17 | 44 |  |  | 17 | 44 | 44 |
|  | SN Defoamer A-63 (remark 11) |  | 0.8 | 0.9 |  |  | 0.8 | 0.9 | 0.9 |
| Composition B | 40% Copolymer water dispersion (A-1) | 70 |  |  | 70 |  |  |  |  |
|  | 40% Copolymer water dispersion (A-2) |  | 35 |  |  |  |  |  |  |
|  | 40% Copolymer water dispersion (A-4) |  |  |  |  | 70 |  |  |  |
|  | 40% Copolymer water dispersion (A-5) |  |  |  |  |  | 35 |  |  |
|  | Texanol | 2 | 3 | 3 | 2 | 2 | 3 | 3 | 3 |
|  | Adekanol UH-438 (remark 12) | 0.7 | 0.5 | 0.8 | 0.7 | 0.7 | 0.5 | 0.8 | 0.8 |
|  | SN Defoamer 380 (remark 13) | 0.8 |  |  | 0.8 | 0.8 |  |  |  |
|  | Modified organosilicate |  |  |  | 1.5 |  |  |  |  |
|  | PVC (%) | 16.4 | 48.6 | 62.6 | 16.4 | 16.4 | 48.6 | 62.6 | 62.6 |

(Remark 7) "Slaoff 72N" : preservative, manufactured by Takeda Chemical Industrties, Ltd.
(Remark 8) "Nopcosand K" : pigment dispersant, manufactured by San Nopco Ltd.
(Remark 9) "Titan White JR-805" : titan white, manufactured by Tayca Corporation
(Remark 10) "Titan White JR-800" : titan white, manufactured by Tayca Corporation
(Remark 11) "SN Defoamer A-63" : defoamer, manufactured by San Nopco tLtd.
(Remark 12) "Adekanol UH-438" : thickener, manufactured by Asahi Denka Kogyo K. K.
(Remark 13) "SN Defoamer 380" : defoamer, manufactured by San Nopco Ltd.

PRODUCTION EXAMPLES 20 TO 27

A vessel was charged in order with the respective components shown in Composition A in the following Table 6, and the mixture was continued to be stirred for 30 minutes by means of a disperser until it was homogenized to obtain a pigment paste. Then, the respective components shown in Composition B in Table 6 were added in order to the above pigment paste, and the mixture was stirred by means of the disperser until it was homogenized to obtain premix coating materials (T-1) to (T-8)

TABLE 6

|  | Production Example | | | | | | | |
|---|---|---|---|---|---|---|---|---|
|  | 20 | 21 | 22 | 23 | 24 | 25 | 26 | 27 |
| Premix coating material name | T-1 | T-2 | T-3 | T-4 | T-5 | T-6 | T-7 | T-8 |
| Composition A | | | | | | | | |
| 40% Copolymer water dispersion (A-1) |  |  | 23.8 |  |  |  |  | 23.8 |
| 51% Copolymer water dispersion (B-1) |  |  | 8 |  |  |  | 18.6 |  |
| 50% Boncoat EC-846 (remark 14) |  |  |  |  |  |  |  | 8.2 |
| Clean water | 5 | 20 |  | 5 | 5 | 5 |  |  |
| Ethylene glycol | 2 | 2 | 2 | 2 | 2 | 2 | 2 | 2 |
| Slaoff 72N (remark 7) | 0.1 | 0.1 | 0.1 | 0.1 | 0.1 | 0.1 | 0.1 | 0.1 |
| Nopcosand K (remark 8) | 0.3 | 0.5 | 0.5 | 0.3 | 0.3 | 0.3 | 0.5 | 0.5 |
| Titan White JR-805 (remark 9) | 20 |  |  | 20 | 20 | 20 |  |  |
| Titan White JR-800 (remark 10) |  | 22 | 15 |  |  |  | 15 | 15 |
| Calcium carbonate |  | 17 | 44 |  |  |  | 44 | 44 |
| SN Defoamer A-63 (remark 11) |  | 0.8 | 0.9 |  |  |  | 0.9 | 0.9 |
| Composition B | | | | | | | | |
| 40% Copolymer water dispersion (A-1) | 49 |  |  | 49 |  | 49 |  |  |
| 40% Copolymer water dispersion (A-2) |  | 24.5 |  |  |  |  |  |  |
| 51% Copolymer water dispersion (B-1) | 16.5 | 8.2 |  | 16.5 | 54.9 |  |  |  |
| 50% Boncoat EC-846 |  |  |  |  |  | 16.8 |  |  |
| Texanol | 2 | 3 | 3 | 2 | 2 | 2 | 3 | 3 |
| Adekanol UH-438 (remark 12) | 0.7 | 0.5 | 0.8 | 0.7 | 0.7 | 0.7 | 0.8 | 0.8 |
| SN Defoamer 380 (remark 13) | 0.8 |  |  | 0.8 | 0.8 | 0.8 |  |  |
| Modified organosilicate |  |  |  | 1.5 |  |  |  |  |
| PVC (%) | 16.4 | 48.6 | 62.6 | 16.4 | 16.4 | 16.4 | 62.6 | 62.6 |
| Solid matter ratio of | | | | | | | | |
| Copolymer water dispersion (A)/ Copolymer water dispersion (B) | 70/ 30 | 70/ 30 | 70/ 30 | 70/ 30 | — | — | — | — |

Production of Pigment-dispersed Paste

PRODUCTION EXAMPLE 28

A vessel was charged in order with the respective components shown below, and the mixture was continued to be stirred for 30 minutes by means of a disperser until it was homogenized to obtain a pigment-dispersed paste.

| Composition of pigment-dispersed paste | |
|---|---|
| Clean water | 8.0 parts |
| Ethylene glycol | 2.0 parts |
| Slaoff 72N (remark 7) | 0.1 part |
| Nopcosand K (remark 8) | 0.3 part |
| Titan White JR-600A (remark 14) | 24.6 parts |
| SN Defoamer A-63 (remark 11) | 0.4 part |

(Remark 14) "Titan White JR-600A": titan white, manufactured by Tayca Corporation Preparation of Premix Coating Materials

PRODUCTION EXAMPLES 29 TO 36

The respective components shown in the following Table 7 were added in order to the above pigment-dispersed paste, and the mixture was stirred by means of a disperser until it was homogenized to obtain premix coating materials (W-1) to (W-8)

TABLE 7

|  | Production Example | | | | | | | |
|---|---|---|---|---|---|---|---|---|
|  | 29 | 30 | 31 | 32 | 33 | 34 | 35 | 36 |
| Premix coating material name | W-1 | W-2 | W-3 | W-4 | W-5 | W-6 | W-7 | W-8 |
| Pigment-dispersed paste | 35.4 | 35.4 | 35.4 | 35.4 | 35.4 | 35.4 | 35.4 | 35.4 |
| 40% Copolymer water dispersion (A-1) | 45.0 | 54.0 | 45.0 | 36.0 | 15.0 | 60.0 |  |  |
| 35% Water base polyurethane resin (U-1) |  | 6.9 |  |  |  |  |  |  |
| 30% Water base polyurethane resin (U-2) | 20.0 |  |  | 16.0 |  | 40.0 |  | 80.0 |
| 30% Water base polyurethane resin (U-3) |  |  | 20.0 |  | 60.0 |  |  |  |
| 51% Carbonyl group-containing (B-1) |  |  |  | 9.4 |  | 23.5 |  |  |
| Texanol | 3.0 | 3.0 | 3.0 | 3.0 | 3.0 | 3.0 | 3.0 | 3.0 |
| Adekanol UH-438 (remark 12) | 0.8 | 0.8 | 0.8 | 0.8 | 0.8 | 0.8 | 0.8 | 0.8 |
| SN Defoamer A-63 (remark 11) | 0.4 | 0.4 | 0.4 | 0.4 | 0.4 | 0.4 | 0.4 | 0.4 |
| Modified organosilicate |  |  |  |  | 1.5 |  |  |  |
| PVC (%) | 20.0 | 20.0 | 20.0 | 20.0 | 20.0 | 20.0 | 20.0 | 20.0 |
| Solid matter ratio of |  |  |  |  |  |  |  |  |
| Copolymer water dispersion A/ | 75/ | 90/ | 75/ | 75/ | 25/ | — | — | — |
| Water base polyurethane resin U | 25 | 10 | 25 | 25 | 75 |  |  |  |

Preparation of Top Coating Materials

EXAMPLES 4 TO 10 AND COMPARATIVE EXAMPLES 5 TO 8

A cross-linking agent was blended with 100 parts of the respective premix coating materials obtained in Production Examples 12 to 19 in combinations shown in the following Table 8 to obtain the respective top coating materials.
Preparation of Test Boards for Top Coating Materials "Multiconcrete Primer EPO" (epoxy base primer, manufactured by Kansai Paint Co., Ltd.) was coated on a slate board of 70×150×5 mm. On the following day, the respective top coating materials shown in the following Table 8 were diluted to about 70 KU by clean water and then coated thereon by means of a brush so that the coating amount was about 0.15 kg/m².

The respective top coating materials and the respective test boards were evaluated according to criteria described later, and the results thereof are shown in Table 8.

Preparation of Under Coating Materials

EXAMPLES 11 TO 14 AND COMPARATIVE EXAMPLES 9 TO 12

A cross-linking agent was blended with 100 parts of the respective premix coating materials obtained in Production Examples 12 to 19 in combinations shown in the following Table 9 to obtain the respective under coating materials.
Preparation of Test Boards for Under Coating Materials "EP Sealer Clear" (water base sealer, manufactured by Kansai Paint Co., Ltd.) was coated on a slate board of 70×150×5 mm, and the respective under coating materials shown in the following Table 9 were coated thereon by means of texture roller so that the coating amount was about 0.8 kg/m².

The respective under coating materials and the respective test boards were evaluated according to criteria described later, and the results thereof are shown in Table 9.

TABLE 8

|  |  | Example | | | | | | | Comparative Example | | | |
|---|---|---|---|---|---|---|---|---|---|---|---|---|
|  |  | 4 | 5 | 6 | 7 | 8 | 9 | 10 | 5 | 6 | 7 | 8 |
| Composition | Premix coating material (100 parts) | P-1 | P-1 | P-1 | P-1 | P-2 | P-2 | P-4 | P-1 | Q-1 | Q-2 | Q-2 |
|  | Adipic acid dihydrazide | 0.1 | 0.2 |  |  | 0.2 | 0.5 | 0.2 |  |  | 0.1 |  |
|  | SX-601 (remark 15) |  |  | 1.2 |  |  |  |  |  |  |  |  |
|  | 20% Bisacetyl dihydrazone (remark 16) |  |  |  | 0.7 |  |  |  |  |  |  |  |
| Number of functional group per mole of carbonyl group |  | 0.14 | 0.28 | 0.31 | 0.29 | 0.28 | 0.69 | 0.28 |  |  | 0.28 |  |
| Evaluation | Coating material storage stability | ◉ | ◉ | ◉ | ◉ | ◉ | ◉ | ◉ | ◉ | ◉ | ◉ | ◉ |
|  | Water resistance in initial drying (outdoor) | ○ | ◉ | ◉ | ◉ | ◉ | ◉ | ◉ | Δ | X | Δ | X |
|  | Water resistance in initial drying (indoor) | ○ | ○ | ○ | ○ | ○ | ◉ | ◉ | X | X | Δ | X |
|  | Outdoor dirt pick-up resistance ΔE | 6.4 | 5.5 | 5.6 | 5.4 | 4.9 | 4.5 | 3.1 | 7.1 | 7.6 | 5.8 | 6.2 |

(Remark 15) "SX-601": semicarbazide base functional group-containing compound, solid content: 45%, —NHCO—NHNH$_2$ content: 4.8 mmol/g resin, manufactured by Asahi Chemical Industries Ltd.
(Remark 16) 20% bisacetyl dihydrazone: methyl ethyl ketone solution

TABLE 9

|  | Example | | | | Comparative Example | | | |
| --- | --- | --- | --- | --- | --- | --- | --- | --- |
|  | 11 | 12 | 13 | 14 | 9 | 10 | 11 | 12 |
| Premix coating material (100 parts) | P-3 | P-3 | P-3 | P-3 | P-3 | Q-3 | Q-3 | Q-4 |
| Adipic acid dihydrazide | 0.05 | 0.1 |  |  |  | 0.1 |  |  |
| SX-601 (remark 15) |  |  | 0.6 |  |  |  |  |  |
| 20% Bisacetyl dihydrazone (remark 16) |  |  |  | 0.4 |  |  |  |  |
| Number of functional group per mole of carbonyl group | 0.14 | 0.29 | 0.32 | 0.34 | 0.00 | 0.29 | 0.00 | 0.00 |
| Coating material storage stablility | ⊚ | ⊚ | ⊚ | ⊚ | ⊚ | ⊚ | ⊚ | ⊚ |
| Water resistance in initial drying (outdoor) | ○ | ⊚ | ⊚ | ⊚ | X | Δ | X | X |
| Water resistance in initial drying (indoor) | ○ | ○ | ○ | ○ | X | Δ | X | X |

Evaluation Test

Storage Stability Test of Coating Material

The respective top coating materials and under coating materials each obtained above were stored in a thermostatic chamber of 50° C. for one month, and then a state of the coating materials was visually observed:

⊚: Good with little change as compared with initial stage

○: A little increased in viscosity but no problems in terms of practical use

Δ: Notably increased in viscosity and not practical but not gelatinized

×: Gelatinized

Water Resistance Test in Initial Drying (Outdoor)

The respective test boards coated with the respective top coating materials and under coating materials each obtained above were put in a cool chamber of 5° C. for 30 minutes immediately after coating and then left standing outdoors (in the shade in the northern side of a building) for about one hour in cloudy weather (conditions of a temperature of 8 to 10° C. and an RH of 65 to 75%) Then, the respective test boards were dipped in water for 10 minutes to visually observe the appearance of the coating films:

⊚: Good with having nothing abnormal on coating film

○: A little delustering and blistering observed but no problems in terms of practical use Δ: Blister was large or found in large amount or a part of coating film was dissolved ×: Coating film was markedly dissolved Water Resistance Test in Initial Drying (Indoor)

The respective test boards coated with the respective top coating materials and under coating materials each obtained above were put in a cool chamber of 10° C. for 30 minutes immediately after coating and then left standing in a bright room which was not directly exposed to the sunlight but admitted natural light for about one hour (conditions of a temperature of 20° C. and an RH of 60 to 70%). Then, the respective test boards were dipped in water for 10 minutes to visually observe the appearance of the coating films:

⊚: Good with having nothing abnormal on coating film

○: A little delustering and blistering observed but no problems in terms of practical use Δ: Blister was large or found in large amount or a part of coating film was dissolved ×: Coating film was markedly dissolved Outdoor Exposure Test (Top Coating Material)

A primer and the respective top coating materials were coated on a slate board of 90×300×5 mm by the same method as in the test board for a top coating material described above, and then the respective top coating materials were further coated thereon in the same manner on the following day and dried at a room temperature for 7 days to prepare test coating boards. Each two boards thereof were prepared. One of them was used for exposure, and the other was used for a blank. The test coating board for exposure was mounted on an exposing board which faced the south at 30 degrees in Tokyo Office of Kansai Paint Co., Ltd., and it was taken out three months later to measure a color difference ΔE thereof from the test coating board for a blank. It is shown that the smaller the value is, the better the dirt pick-up resistance is.

Preparation of Top Coating Materials

EXAMPLES 15 TO 22 AND COMPARATIVE EXAMPLES 13 TO 15

A cross-linking agent was blended with 100 parts of the respective premix coating materials obtained in Production Examples 20 to 27 in combinations shown in the following Table 10 to obtain the respective top coating materials.

Preparation of Test Boards for Top Coating Materials

"Multiconcrete Primer EPO" (epoxy base primer, manufactured by Kansai Paint Co., Ltd.) was coated on a slate board of 70×150×5 mm. On the following day, the respective top coating materials shown in the following Table 10 were diluted to about 70 KU by clean water and then coated thereon by means of a brush so that the coating amount was about 0.15 kg/m².

The respective top coating materials and the respective test boards were evaluated according to criteria described later, and the results thereof are shown in Table 10.

TABLE 10

|  |  | Example |  |  |  |  |  |  | Comparatie Example |  |  |  |
|---|---|---|---|---|---|---|---|---|---|---|---|---|
|  |  | 15 | 16 | 17 | 18 | 19 | 20 | 21 | 22 | 13 | 14 | 15 |
| Composition | Premix coating material (100 parts) | T-1 | T-1 | T-1 | T-1 | T-2 | T-2 | T-2 | T-4 | T-1 | T-5 | T-6 |
|  | Adipic acid dihydrazide | 0.1 | 0.2 |  |  | 0.2 | 0.5 | 1.5 | 0.2 |  | 0.1 | 0.1 |
|  | SX-601 (remark 15) |  |  | 1.2 |  |  |  |  |  |  |  |  |
|  | 20% Bisacetyl dihydrazone (remark 16) |  |  |  | 0.7 |  |  |  |  |  |  |  |
| Number of functional group per mole of carbonyl group |  | 0.13 | 0.27 | 0.30 | 0.28 | 0.27 | 0.49 | 2.03 | 0.27 | 0.00 | 0.12 | 0.19 |
| Evaluation | Coating material storage stability | ◎ | ◎ | ◎ | ◎ | ◎ | ◎ | Δ | ◎ | ◎ | ◎ | ◎ |
|  | Water resistance in initial drying (outdoor) | ○ | ◎ | ◎ | ◎ | ◎ | ◎ | ◎ | ◎ | Δ | Δ | Δ |
|  | Water resistance in initial drying (indoor) | ○ | ○ | ○ | ○ | ○ | ◎ | ◎ | ○ | X | Δ | Δ |
|  | Outdoor ΔE | 6.4 | 5.5 | 5.6 | 5.4 | 4.9 | 4.5 | 6.1 | 3.1 | 7.1 | 5.8 | 5.8 |
|  | exposure Brittleness of coating film | ○ | ○ | ○ | ○ | ○ | ○ | ○ | ○ | ○ | ○ | ○ |

Preparation of Under Coating Materials

EXAMPLES 23 TO 26 AND COMPARATIVE EXAMPLES 16 TO 18

A cross-linking agent was blended with 100 parts of the respective premix coating materials obtained in Production Examples 20 to 27 in combinations shown in the following Table 11 to obtain the respective under coating materials.

Preparation of Test Boards for Under Coating Materials

"EP Sealer Clear" (water base sealer, manufactured by Kansai Paint Co., Ltd.) was coated on a slate board of 70×150×5 mm, and the respective under coating materials shown in the following Table 11 were coated thereon by means of a texture roller so that the coating amount was about 0.8 kg/m².

The respective under coating materials and the respective test boards were evaluated according to criteria described later, and the results thereof are shown in Table 11.

In the outdoor exposure test described above, the appearance of the coating film on the test board after exposure was visually observed to evaluate the brittleness of the coating film:
  ○: No cracks produced on coating film
  x: Cracks produced on coating film
  Cracking Resistance (Under Coating Material)
  The respective test coating boards coated with the respective under coating materials obtained above were dried for 3 days on the conditions of 20° C. and 65% RH, and then the appearance of the coating films was visually observed to evaluate the cracking property:
  ○: No cracks produced on coating film
  x: Cracks produced on coating film Preparation of Coating Materials

EXAMPLES 27 TO 34 AND COMPARATIVE EXAMPLES 19 TO 22

A cross-linking agent was blended with 100 parts of the respective premix coating materials obtained in Production

TABLE 11

|  | Example |  |  |  | Comparative Example |  |  |
|---|---|---|---|---|---|---|---|
|  | 23 | 24 | 25 | 26 | 16 | 17 | 18 |
| Premix coating material (100 parts) | T-3 | T-3 | T-3 | T-3 | T-3 | T-7 | T-8 |
| Adipic acid dihydrazide | 0.05 | 0.1 |  |  |  |  |  |
| SX-601 (remark 15) |  |  | 0.6 |  |  |  |  |
| 20% Bisacetyl dihydrazone (remark 16) |  |  |  | 0.4 |  |  |  |
| Number of functional group per mole of carbonyl group | 0.14 | 0.28 | 0.31 | 0.33 | 0.00 | 0.24 | 0.39 |
| Coating material storage stablility | ◎ | ◎ | ◎ | ◎ | ◎ | ◎ | ◎ |
| Water resistance in initial drying (outdoor) | ○ | ◎ | ◎ | ◎ | X | Δ | Δ |
| Water resistance in initial drying (indoor) | ○ | ○ | ○ | ○ | X | Δ | Δ |
| Cracking resistance | ○ | ○ | ○ | ○ | ○ | ○ | ○ |

Evaluation Test
  Storage Stability Test of Coating Material
  The same as in Examples 4 to 14 described above
  Water Resistance Test in Initial Drying (Outdoor)
  The same as in Examples 4 to 14 described above
  Water Resistance Test in Initial Drying (Indoor)
  The same as in Examples 4 to 14 described above
  Outdoor Exposure Test (Top Coating Material)
  The same as in Examples 4 to 14 described above
  Brittleness of Coating Film (Top Coating Material)

Examples 29 to 36 in combinations shown in the following Table 12 to obtain the respective coating materials.

Preparation of Test Coating Boards

"Multiconcrete Primer EPO" (epoxy base primer, manufactured by Kansai Paint Co., Ltd.) was coated on a slate board of 70×150×5 mm. On the following day, the respective coating materials shown in the following Table 12 were diluted to about 70 KU by clean water and then coated thereon by means of a brush so that the coating amount was about 0.15 kg/m².

The respective coating materials and the respective test boards were evaluated according to criteria described later, and the results thereof are shown in Table 12.

TABLE 12

|  | Example | | | | | | | | Comparative Example | | | |
| --- | --- | --- | --- | --- | --- | --- | --- | --- | --- | --- | --- | --- |
|  | 27 | 28 | 29 | 30 | 31 | 32 | 33 | 34 | 19 | 20 | 21 | 22 |
| Premix coating material (100 parts) | W-1 | W-1 | W-1 | W-2 | W-3 | W-4 | W-5 | W-2 | W-6 | W-7 | W-8 | W-1 |
| Adipic acid dihydrazide | 0.1 |  |  | 0.2 |  |  | 0.2 | 1.2 | 0.3 |  |  |  |
| SX-601 (remark 15) |  | 1 |  |  | 1 |  |  |  |  | 1 |  |  |
| 20% Bisacetyl dihydrazone (remark 16) |  |  | 0.6 |  |  | 0.6 |  |  |  |  | 0.5 |  |
| Number of functional group per mole of carbonyl group | 0.18 | 0.34 | 0.33 | 0.54 | 0.35 | 0.31 | 0.50 | 2.35 | 0.57 | 0.30 | 0.39 | 0.00 |
| Storage stability | ⊚ | ⊚ | ⊚ | ⊚ | ⊚ | ⊚ | ⊚ | Δ | ⊚ | ⊚ | ⊚ | ⊚ |
| Water resistance in initial drying (outdoor) | ○ | ⊚ | ⊚ | ⊚ | ⊚ | ⊚ | ⊚ | ⊚ | Δ | ⊚ | Δ | Δ |
| Water resistance in initial drying (indoor) | ○ | ○ | ○ | ⊚ | ○ | ○ | ⊚ | ⊚ | ○ | ○ | Δ | X |
| Elongation of coating film at low temperature | ○ | ○ | ○ | ○ | ○ | ○ | ○ | ○ | ○ | X | ○ | ○ |
| Outdoor exposure test | ○ | ○ | ○ | ○ | ○ | ○ | ⊚ | ○ | ○ | ○ | ○ | Δ |

Evaluation Test

Storage Stability Test of Coating Material

The same as in Examples 4 to 14 described above.

Water Resistance Test in Initial Drying (Outdoor)

The same as in Examples 4 to 14 described above.

Water Resistance Test in Initial Drying (Indoor)

The same as in Examples 4 to 14 described above.

Elongation Percentage of Coating Film at Low Temperature

The respective coating materials were coated on releasing paper by means of a 150 μm applicator and dried for 28 days in a thermo-hygrostat of 20° C. and 65% RH. Then, the coating film was peeled off from the releasing paper to obtain a coating film piece having a film thickness of about 40 μm. An elongation percentage of this coating film piece was measured at a stretching speed of 20 mm/min on the condition of −10° C.:

○: 20% or more

Δ: 5% or more and less than 20% x: less than 5%

Outdoor Exposure Test (Dirt Pick-up Resistance)

A primer and the respective top coating materials were coated on a slate board of 90×300×5 mm by the same method in the test board for a top coating material described above, and then the respective top coating materials were coated thereon in the same manner on the following day and dried at a room temperature for 7 days to prepare test coating boards. Each two boards thereof were prepared. One of them was used for exposure, and the other was used for a blank. The test coating board for exposure was mounted on an exposing board which faced the south at 30 degrees in Tokyo Office of Kansai Paint Co., Ltd., and it was taken out three months later to measure a color difference ΔE thereof from the test coating board for a blank:

⊚: ΔE is less than 3

○: ΔE is 3 or more and less than 5

Δ: ΔE is 5 or more and less than 7 x: ΔE is 7 or more

What is claimed is:

1. A curable water base resin composition comprising:

(I) a copolymer obtained by copolymerizing an ethylenically unsaturated monomer (a) having a maleimide group, an ethylenically unsaturated monomer (b) having a carbonyl group and other ethylenically unsaturated monomer (c) and (II) a compound having two or more groups per molecule which are the same or different and selected from a hydrazide group, a semicarbazide group and hydrazone group.

2. The resin composition as described in claim 1, wherein the ethylenically unsaturated monomer (a) is a compound having an ethylenically unsaturated group and a cyclic imide group represented by the following Formula (1):

wherein $R^1$ and $R^2$ each represent independently a hydrogen atom or an alkyl group, or $R^1$ and $R^2$ represent a group forming a carbon ring together with carbon atoms to which they are bonded.

3. The resin composition as described in claim 2, wherein the compound having a cyclic imide group is imide (meth)acrylate represented by the following Formula (2):

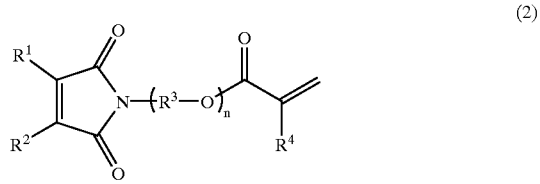

wherein $R^1$ and $R^2$ are synonymous with those described in claim 2; $R^3$ represents an alkylene group; $R^4$ represents a hydrogen atom or methyl; and n is an integer of 1 to 6.

4. The resin composition as described in claim 3, wherein imide (meth)acrylate is selected from the group consisting of compounds represented by the following Formulas (3) and (4):

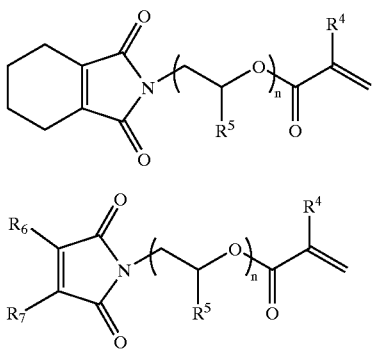

(3)

(4)

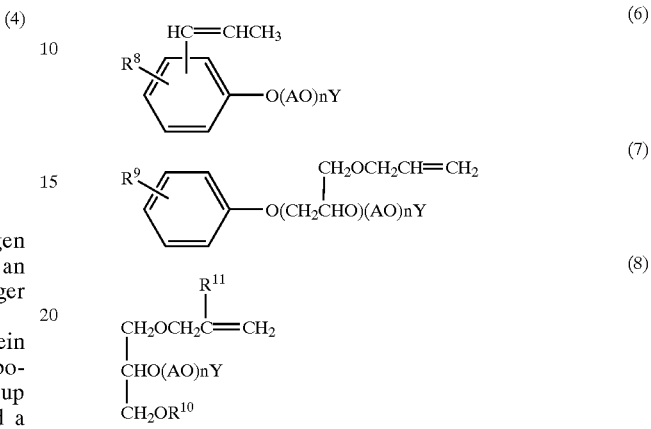

wherein $R^4$ and $R^5$ each represent independently a hydrogen atom or methyl; $R^6$ and $R^7$ each represent independently an alkyl group having 4 or less carbon atoms; and n is an integer of 1 to 6.

5. The resin composition as described in claim 1, wherein the ethylenically unsaturated monomer (b) having a carbonyl group is a monomer having at least one carbonyl group selected from an aldehyde group and a keto group and a polymerizable double bond in a molecule.

6. The resin composition as described in claim 1, wherein the ethylenically unsaturated monomer (b) having a carbonyl group is selected from the group consisting of (meth) acrolein formylstyrol, vinyl methyl ketone, vinyl ethyl ketone, vinyl butyl ketone and diacetone(meth)acrylamide.

7. The resin composition as described in claim 6, wherein the ethylenically unsaturated monomer (b) having a carbonyl group is diacetone(meth)acrylamide.

8. The resin composition as described in claim 1, wherein the other ethylenically unsaturated monomer (c) is selected from the group consisting of alkyl (meth)acrylates having an alkyl group having 1 to 8 carbon atoms, (meth)acrylic acid, styrene, hydroxyalkyl (meth)acrylates having an alkylene group having 2 to 3 carbon atoms and cyclohexyl (meth) acrylate.

9. The resin composition as described in claim 1, wherein the copolymer (I) is obtained by copolymerizing the ethylenically unsaturated monomer (a) having a maleimide group, the ethylenically unsaturated monomer (b) having a carbonyl group and the other ethylenically unsaturated monomer (c) each described above in the presence of a surfactant as an emulsifier according to a conventional emulsion polymerization method.

10. The resin composition as described in claim 1, wherein the copolymer (I) is obtained by copolymerizing the ethylenically unsaturated monomer (a) having a maleimide group, the ethylenically unsaturated monomer (b) having a carbonyl group and the other ethylenically unsaturated monomer (c) in such a proportion that the monomer (a) falls in a range of 1 to 40% by weight; the monomer (b) falls in a range of 1 to 30% by weight; and the monomer (c) falls in a range of 40 to 98% by weight each based on the total amount of the monomers (a), (b) and (c).

11. The resin composition as described in claim 1, wherein the copolymer (I) is obtained by copolymerizing the ethylenically unsaturated monomer (a) having a maleimide group, the ethylenically unsaturated monomer (b) having a carbonyl group and the other ethylenically unsaturated monomer (c) in such a proportion that the monomer (a) falls in a range of 4 to 20% by weight; the monomer (b) falls in a range of 2 to 25% by weight; and the monomer (c) falls in a range of 55 to 94% by weight each based on the total amount of the monomers (a), (b) and (c).

12. The resin composition as described in claim 9, wherein the emulsifier is a radically polymerizable surfactant.

13. The resin composition as described in claim 12, wherein the radically polymerizable surfactant is selected from the group consisting of compounds represented by the following Formulas (6), (7) and (8):

wherein $R^8$ and $R^9$ each represent independently a linear or branched alkyl group having 6 to 18 carbon atoms; $R^{10}$ represents an alkyl group having 8 to 24 carbon atoms; $R^{11}$ represents a hydrogen atom or methyl; AO represents an oxyalkylene group; n represents an integer of 2 or more; and Y represents an ion-dissociative group.

14. The resin composition as described in claim 1, wherein the copolymer (I) has a number average molecular weight falling in a range of 1,000 to 1,000,000.

15. The resin composition as described in claim 1, wherein the compound (II) is selected from the group consisting of oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide, phthalic acid dihydrazide, terephthalic acid dihydrazide, isophthalic acid dihydrazide, dihydrazide, trihydrazide or tetrahydrazide of pyromellitic acid, nitrilotriacetic acid trihydrazide, citric acid trihydrazide, 1,2,4-benzenetrihydrazide, ethylenediaminetetraacetic acid tetrahydrazide, 1,4,5,8-naphthoic acid tetrahydrazide, polyhydrazide obtained by reacting a low polymer having a carboxylic acid lower alkyl ester group with hydrazine or a hydrazine hydrate, carbonic acid dihydrazide, bissemicarbazide, multifunctional semicarbazides obtained by reacting diisocyanates or polyisocyanate compounds derived from them with N,N-substituted hydrazines or hydrazides in excess amounts, water base multifunctional semicarbazides obtained by reacting dihydrazides in excess amounts with isocyanate groups contained in reaction products of the above polyisocyanate compounds with active hydrogen compounds having hydrophilic groups such as polyetherpolyols and polyethylene glycol monoalkyl ethers, mixtures of the above multifunctional semicarbazides and water base multifunctional semicarbazides and bisacetyl dihydrazone.

16. The resin composition as described in claim 1, wherein the compound (II) is dihydrazide of saturated aliphatic dicarboxylic acid having 2 to 18 carbon atoms.

17. The resin composition as described in claim 16, wherein the compound (II) is adipic acid dihydrazide or succinic acid dihydrazide.

18. The resin composition as described in claim 1, further comprising as an additional component:
(III) a copolymer having a carbonyl group and/or
(IV) a water base polyurethane resin having a carbonyl group or a hydrazine group.

19. The resin composition as described in claim 18, wherein the copolymer (III) is obtained by copolymerizing an ethylenically unsaturated monomer (d) having a carbonyl group with other ethylenically unsaturated monomer (e).

20. The resin composition as described in claim 19, wherein the ethylenically unsaturated monomer (d) having a carbonyl group is selected from the group consisting of (meth)acrolein, formylstyrol, vinyl methyl ketone, vinyl ethyl ketone, vinyl butyl ketone and diacetone(meth) acrylamide.

21. The resin composition as described in claim 19, wherein the other ethylenically unsaturated monomer (e) is selected from the group consisting of styrene, alkyl (meth) acrylate having 1 to 8 carbon atoms, (meth)acrylic acid and acrylamide.

22. The resin composition as described in claim 19, wherein the copolymer (III) is obtained by copolymerizing the ethylenically unsaturated monomer (d) having a carbonyl group with the other ethylenically unsaturated monomer (e) in the presence of a surfactant as an emulsifier according to a conventional emulsion polymerization method.

23. The resin composition as described in claim 19, wherein the copolymer (III) is obtained by copolymerizing the ethylenically unsaturated monomer (d) having a carbonyl group and the other ethylenically unsaturated monomer (e) in such a proportion that the ethylenically unsaturated monomer (d) having a carbonyl group falls in a range of 2 to 30% by weight and the other ethylenically unsaturated monomer (e) falls in a range of 70 to 98% by weight each based on the total amount of the monomers (d) and (e).

24. The resin composition as described in claim 18, wherein the copolymer (III) has a number average molecular weight falling in a range of 5,000 to 1,000,000.

25. The resin composition as described in claim 1, wherein the water base polyurethane resin (IV) has an acid value falling in a range of 10 to 200 mg KOH/g per resin solid matter.

26. The resin composition as described in claim 1, wherein the water base polyurethane resin (IV) is selected from the group consisting of:
(i) a water base polyurethane resin having a hydrazine group prepared by dispersing a urethane prepolymer (A) obtained by reacting a diisocyanate compound (f) and a glycol compound (g) with a glycol compound (h) having a carboxyl group together with a hydrazine derivative (i) in an aqueous medium;
(ii) a water base polyurethane resin having a carbonyl group prepared by dispersing in an aqueous medium, a urethane prepolymer (B) obtained by reacting the diisocyanate compound (f), the glycol compound (g), the glycol compound (h) having a carboxyl group and an alcohol (j) having a carbonyl group; and
(iii) a water base polyurethane resin having a carbonyl group obtained by copolymerizing in an aqueous medium, a monomer mixture comprising an unsaturated group-containing urethane prepolymer (C) obtained by reacting the diisocyanate compound (f), the glycol compound (g), the glycol compound (h) having a carboxyl group and a hydroxyl group-containing ethylenically unsaturated monomer (k) and an ethylenically unsaturated monomer (m) having a carbonyl group.

27. The resin composition as described in claim 26, wherein the water base polyurethane resin (i) contains a hydrazine residue in a range of 0.005 to 0.2 mole per 100 g of the resin solid matter.

28. The resin composition as described in claim 26, wherein the polyurethane resin (ii) contains a carbonyl group in a range of 0.005 to 0.3 mole per 100 g of the resin solid matter.

29. The resin composition as described in claim 26, wherein the polyurethane resin (ii) contains a carbonyl group in a range of 0.005 to 0.3 mole per 100 g of the resin solid matter.

30. The resin composition as described in claim 1, comprising the compound (II) in such a proportion that a functional group contained in the compound (II) falls in a range of 0.01 to 2 mole per mole of a carbonyl group contained in the copolymer (I).

31. The resin composition as described in claim 18, comprising the compound (II) in such a proportion that a functional group contained in the compound (II) falls in a range of 0.01 to 2 mole per mole of the total amount of the carbonyl groups contained in the copolymer (I), the copolymer (III) and the water base polyurethane resin.

32. The resin composition as described in claim 18, comprising the copolymer (III) in a range of 7/93 to 90/10 in terms of a solid matter weight ratio of copolymer (I)/copolymer (III).

33. The resin composition as described in claim 18, comprising the water base polyurethane resin (IV) in a range of 95/5 to 10/90 in terms of a solid matter weight ratio of copolymer (I)/water base polyurethane resin (IV).

34. The resin composition as described in claim 1, further comprising an organosilicate compound or a condensation product thereof; or a modified organosilicate compound prepared by reacting the organosilicate compound or condensation product thereof with a polyalkylene glycol base compound of 0.01 to 0.5 mole per mole of an alkoxy group or a hydroxyl group thereof.

35. The resin composition as described in claim 34, wherein the organosilicate compound is a compound represented by the following Formula (9):

wherein $R^{12}$ is the same or different and represents a hydrogen atom or a monovalent hydrocarbon group having 1 to 10 carbon atoms.

36. The resin composition as described in claim 34, wherein the polyalkylene glycol base compound as a modifying agent is a compound represented by the following Formula (10):

wherein $R^{13}$ represents a hydrogen atom, an alkyl group or an aryl group; $R^{14}$ represents an alkylene group having 2 to 4 carbon atoms; and n is 2 to 60.

37. The resin composition as described in claim 34, comprising the organosilicate compound or the condensation product thereof or the modified organosilicate compound in a range of 0.1 to 50 parts by weight per 100 parts by weight of the resin solid matter contained in the resin composition.

38. A water base coating material composition comprising the resin composition as described in claim 1.

39. The water base coating material composition as described in claim 38, further comprising a pigment.

40. The water base coating material composition as described in claim 39, comprising the pigment in such a proportion that the pigment volume concentration falls in a range of 10 to 70%.

41. An article coated with the water base coating material composition as described in claim 38.

* * * * *